US011048181B2

(12) United States Patent
Iwasaki et al.

(10) Patent No.: US 11,048,181 B2
(45) Date of Patent: Jun. 29, 2021

(54) ELECTROPHOTOGRAPHIC PHOTORECEPTOR, PROCESS CARTRIDGE, AND IMAGE-FORMING APPARATUS

(71) Applicant: FUJIFILM Business Innovation Corp., Tokyo (JP)

(72) Inventors: Masahiro Iwasaki, Kanagawa (JP); Wataru Yamada, Kanagawa (JP); Ryosuke Fujii, Kanagawa (JP); Keisuke Kusano, Kanagawa (JP); Taisuke Fukui, Kanagawa (JP); Yuto Okazaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/514,442

(22) Filed: Jul. 17, 2019

(65) Prior Publication Data
US 2020/0257212 A1    Aug. 13, 2020

(30) Foreign Application Priority Data

Feb. 8, 2019    (JP) .............................. JP2019-021474

(51) Int. Cl.
*G03G 5/147*      (2006.01)
*G03G 15/00*    (2006.01)
(Continued)

(52) U.S. Cl.
CPC ......... *G03G 5/14726* (2013.01); *C08F 14/26* (2013.01); *C08F 267/06* (2013.01);
(Continued)

(58) Field of Classification Search
CPC ............... G03G 5/147; G03G 5/14708; G03G 5/14713; G03G 5/14726
See application file for complete search history.

(56) References Cited

U.S. PATENT DOCUMENTS

| 4,792,507 A | 12/1988 | Yoshihara et al. |
| 5,115,038 A | 5/1992 | Ihara et al. |
| (Continued) | | |

FOREIGN PATENT DOCUMENTS

| EP | 2296043 | * 3/2011 | ......... G03G 9/09725 |
| JP | 63-221355 A | 9/1988 | |
| (Continued) | | | |

OTHER PUBLICATIONS

Translation of JP 2010-0204136.*
Translation of WO 2009-001894.*

*Primary Examiner* — Peter L Vajda
(74) *Attorney, Agent, or Firm* — Sughrue Mion, PLLC

(57) ABSTRACT

An electrophotographic photoreceptor includes a conductive substrate and a photosensitive layer disposed on the conductive substrate. An outermost surface layer of the electrophotographic photoreceptor contains fluorine-containing resin particles and a fluorine-containing graft polymer having a fluorinated alkyl group. In an infrared absorption spectrum of the fluorine-containing graft polymer, a ratio of a peak area in a wavenumber range of from 1,020 $cm^{-1}$ to 1,308 $cm^{-1}$ to a peak area in a wavenumber range of from 1,673 $cm^{-1}$ to 1,779 $cm^{-1}$ is 2.7 or more and 4.8 or less.

14 Claims, 3 Drawing Sheets

(51) Int. Cl.
 *C08F 267/06* (2006.01)
 *G03G 21/18* (2006.01)
 *C08F 14/26* (2006.01)
(52) U.S. Cl.
 CPC ..... *G03G 5/14734* (2013.01); *G03G 5/14791* (2013.01); *G03G 15/75* (2013.01); *G03G 21/1803* (2013.01)

(56) References Cited

U.S. PATENT DOCUMENTS

2005/0026058 A1    2/2005  Kami et al.
2007/0276068 A1 *  11/2007  Hintzer ............... C09D 127/18
                                          524/284

FOREIGN PATENT DOCUMENTS

| | | | | |
|---|---|---|---|---|
| JP | 04-20507 A | | 1/1992 | |
| JP | 06-332217 A | | 12/1994 | |
| JP | 2005-062830 A | | 3/2005 | |
| JP | 2010-0204136 | * | 9/2010 | ............ G03G 5/147 |
| JP | 5544850 B2 | | 7/2014 | |
| WO | WO 2009-001894 | * | 12/2008 | ............ C08F 14/26 |

\* cited by examiner

ELECTROPHOTOGRAPHIC PHOTORECEPTOR, PROCESS CARTRIDGE, AND IMAGE-FORMING APPARATUS

CROSS-REFERENCE TO RELATED APPLICATIONS

This application is based on and claims priority under 35 USC 119 from Japanese Patent Application No. 2019-021474 filed Feb. 8, 2019.

BACKGROUND

(i) Technical Field

The present disclosure relates to an electrophotographic photoreceptor, a process cartridge, and an image-forming apparatus.

(ii) Related Art

An apparatus that sequentially performs charging, formation of an electrostatic latent image, development, transfer, cleaning, etc. by using an electrophotographic photoreceptor (hereinafter may be referred to as a "photoreceptor") has been widely known as an electrophotographic image-forming apparatus.

Known electrophotographic photoreceptors include a function-separation-type photoreceptor in which a charge generation layer that generates charges and a charge transport layer that transports charges are formed on a conductive substrate such as an aluminum substrate, and a single-layer-type photoreceptor in which a single layer performs both the function of generating charges and the function of transporting charges.

For example, Japanese Unexamined Patent Application Publication No. 63-221355 discloses "an electrophotographic photoreceptor including a conductive support and a photosensitive layer on the conductive support, in which a surface layer contains a fluorine-containing resin powder and a fluorine-containing graft polymer". Japanese Unexamined Patent Application Publication No. 63-221355 discloses that the dispersibility of fluorine-containing resin particles is improved by adding a fluorine-containing graft polymer as a dispersing aid.

For example, Japanese Unexamined Patent Application Publication No. 6-332217 discloses "an electrophotographic photoreceptor including a conductive support and a photosensitive layer on the conductive support, in which a surface layer of the photoreceptor contains a polytetrafluoroethylene resin, a comb-like fluorine-containing graft polymer, and a fluorine-containing surfactant having a nonionic perfluoroalkyl group".

For example, Japanese Unexamined Patent Application Publication No. 2005-062830 discloses "an electrophotographic photoreceptor including a conductive support, and a photosensitive layer or a photosensitive layer and a protective layer that are disposed on the conductive support either directly or with an undercoat layer therebetween, in which an outermost surface layer contains at least fluororesin particles and a fluorine-containing surfactant, a content of the fluororesin particles is 20% by volume or more and 70% by volume or less relative to a total volume of the outermost surface layer, a solid content of the fluorine-containing surfactant is 5% by weight or more and 70% by weight or less relative to a total weight of a mixture of a solid of the fluorine-containing surfactant and a binder resin of the outermost surface layer, and surface free energy of the fluororesin particles is higher than surface free energy of the mixture of the fluorine-containing surfactant and the binder resin of the outermost surface layer".

For example, Japanese Patent No. 5544850 discloses "an electrophotographic photoreceptor including a conductive support and at least a photosensitive layer on the conductive support, in which a surface layer contains fluorine-containing resin particles and a fluorine-containing graft polymer that includes specific structural units, that has a fluorine content of 10% by mass or more and 40% by mass or less, that has a weight-average molecular weight Mw of 50,000 or more and 200,000 or less, that has a ratio [Mw/Mn] of the weight-average molecular weight Mw to the number-average molecular weight Mn of 1 or more and 8 or less, and that has a perfluoroalkyl group having 1 to 6 carbon atoms such that a content of the fluorine-containing graft polymer is 0.5% by mass or more and 5.0% by mass or less relative to the fluorine-containing resin particles".

SUMMARY

Hitherto, fluorine-containing resin particles have been blended in a surface layer of an electrophotographic photoreceptor in order to enhance the cleanability. In addition, a dispersant such as a fluorine-containing graft polymer is used in order to enhance the dispersibility of the fluorine-containing resin particles.

However, even when the dispersant is blended, together with fluorine-containing resin particles, in a coating liquid for forming the surface layer of the electrophotographic photoreceptor to enhance the dispersibility of the fluorine-containing resin particles, the dispersibility may decrease with time, and sedimentation or reaggregation of the fluorine-containing resin particles may occur.

When the coating liquid in which the dispersibility of the fluorine-containing resin particles has been decreased is used to form the surface layer of the electrophotographic photoreceptor, the cleanability may locally decrease. After the application of the coating liquid, the dispersibility of fluorine-containing resin particles may be decreased by a change in the concentration of components due to, for example, drying of the resulting coating film, and the cleanability may locally decrease.

Aspects of non-limiting embodiments of the present disclosure relate to an electrophotographic photoreceptor that has an outermost surface layer containing fluorine-containing resin particles and a fluorine-containing graft polymer having a fluorinated alkyl group, in which a local decrease in cleanability is suppressed compared with a case where, in an infrared absorption spectrum of the fluorine-containing graft polymer, a ratio of a peak area in a wavenumber range of from $1,020$ $cm^{-1}$ to $1,308$ $cm^{-1}$ to a peak area in a wavenumber range of from $1,673$ $cm^{-1}$ to $1,779$ $cm^{-1}$ is less than 2.8 or more than 4.8.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an electrophotographic photoreceptor including a conductive substrate and a photosensitive layer disposed on the conductive substrate. An outermost surface layer of the electrophotographic photoreceptor contains fluorine-containing resin particles and a fluorine-containing graft polymer having a fluorinated alkyl group. In an infrared absorption spectrum of the fluorine-containing graft polymer, a ratio of a peak area in a wavenumber range of from 1,020 $cm^{-1}$ to 1,308 $cm^{-1}$ to a peak area in a wavenumber range of from 1,673 $cm^{-1}$ to 1,779 $cm^{-1}$ is 2.7 or more and 4.8 or less.

BRIEF DESCRIPTION OF THE DRAWINGS

Exemplary embodiments of the present disclosure will be described in detail based on the following figures, wherein.

DETAILED DESCRIPTION

Figure 1:
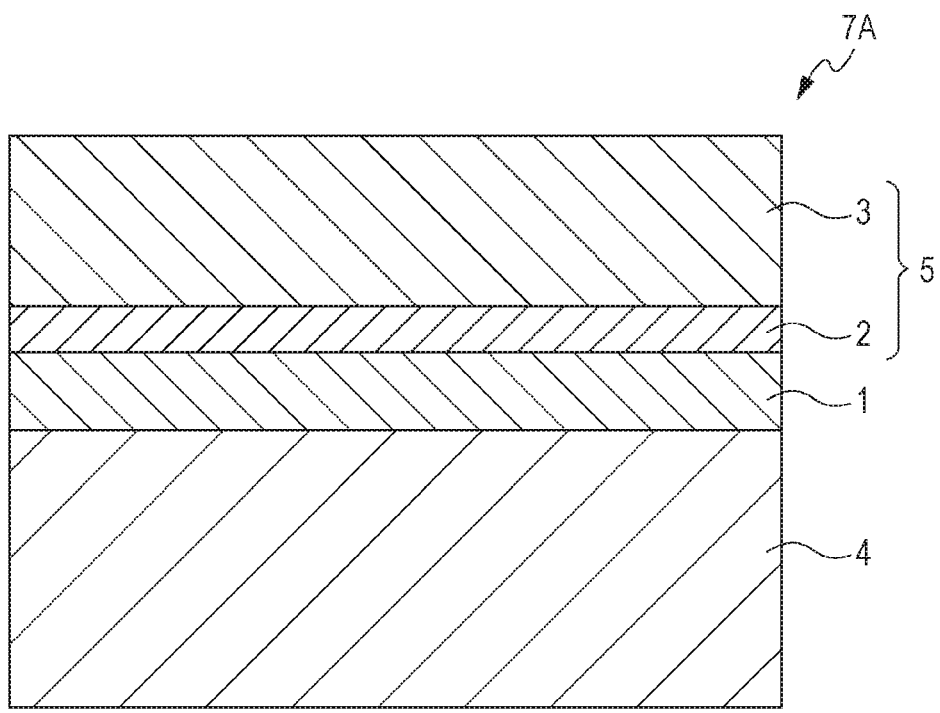
FIG. 1 is a schematic sectional view illustrating an example of a layer structure of an electrophotographic photoreceptor according to an exemplary embodiment.

An exemplary embodiment, which is an example of the present disclosure, will now be described in detail.
Electrophotographic Photoreceptor An electrophotographic photoreceptor according to the exemplary embodiment includes a conductive substrate and a photosensitive layer disposed on the conductive substrate, in which an outermost surface layer of the electrophotographic photoreceptor contains fluorine-containing resin particles and a fluorine-containing graft polymer having a fluorinated alkyl group.

In an infrared absorption spectrum of the fluorine-containing graft polymer, a ratio of a peak area in a wavenumber range of from 1,020 $cm^{-1}$ to 1,308 $cm^{-1}$ to a peak area in a wavenumber range of from 1,673 $cm^{-1}$ to 1,779 $cm^{-1}$ is 2.7 or more and 4.8 or less.

With the above configuration, the photoreceptor according to the exemplary embodiment suppresses a local decrease in cleanability. The reason for this may be as follows.

Hitherto, fluorine-containing resin particles have been blended in a surface layer of an electrophotographic photoreceptor in order to enhance the cleanability. In addition, a dispersant such as a fluorine-containing graft polymer is used in order to enhance the dispersibility of the fluorine-containing resin particles.

However, even when the dispersant is blended, together with fluorine-containing resin particles, in a coating liquid for forming the surface layer of the electrophotographic photoreceptor to enhance the dispersibility of the fluorine-containing resin particles, the dispersibility may decrease with time, and sedimentation or reaggregation of the fluorine-containing resin particles may occur.

When the coating liquid in which the dispersibility of the fluorine-containing resin particles has been decreased is used to form the surface layer of the electrophotographic photoreceptor, the dispersibility of the fluorine-containing resin particles in the surface layer decreases, and cleaning defects may locally occur. After the application of the coating liquid, the dispersibility of fluorine-containing resin particles may be decreased by a change in the concentration of components due to, for example, drying of the resulting coating film, and the cleanability may locally decrease.

In the fluorine-containing graft polymer used as the dispersant, a fluorine component (specifically, for example, a fluorinated alkyl group) in the polymer interacts with fluorine-containing resin particles easily and strongly. On the other hand, in the fluorine-containing graft polymer, a carbonyl group (that is, $>C=O$) derived from an ester moiety, which is a polar group in the polymer, interacts with a vehicle (specifically, a binder resin (binder resin such as a polycarbonate resin or a polyarylate resin) and a solvent) of the coating liquid easily and strongly.

Dispersion stabilization of fluorine-containing resin particles caused by a fluorine-containing graft polymer, which is referred to as stabilization due to steric hindrance, is determined by the balance between the affinity between the fluorine-containing graft polymer and the fluorine-containing resin particles and the affinity between the fluorine-containing graft polymer and the vehicle of the coating liquid.

When the affinity between the fluorine-containing graft polymer and the fluorine-containing resin particles is excessively higher than the affinity between the fluorine-containing graft polymer and the vehicle of the coating liquid, the fluorine-containing graft polymer adhering to the fluorine-containing resin particles does not dissolve or spread in the dispersion liquid, and stabilization of the fluorine-containing resin particles due to the steric hindrance of the fluorine-containing graft polymer tends to decrease.

In contrast, when the affinity between the fluorine-containing graft polymer and the fluorine-containing resin particles is excessively lower than the affinity between the fluorine-containing graft polymer and the vehicle of the coating liquid, the fluorine-containing graft polymer is unlikely to adhere to the fluorine-containing resin particles, and it becomes difficult for the fluorine-containing graft polymer to exert the function of the dispersant.

In this state, the dispersibility of the fluorine-containing resin particles is decreased with time by, for example, a mechanical load due to circulation of the coating liquid for forming a surface layer, a temperature change during storage of the coating liquid, a change in components of the coating liquid with time due to, for example, volatilization of a solvent, or a change in component concentrations during drying of a coating film of the coating liquid, and sedimentation or reaggregation of the fluorine-containing resin particles tends to occur.

As a result, dispersibility of the fluorine-containing resin particles in the surface layer of the photoreceptor decreases, and unevenness of the concentration of the fluorine-containing resin particles is generated in the surface layer of the photoreceptor, which may result in local cleaning defects in portions having a low concentration of the fluorine-containing resin particles.

In contrast, in the photoreceptor according to the exemplary embodiment, a fluorine-containing graft polymer whose infrared absorption spectrum has a peak area ratio of 2.7 or more and 4.8 or less, the peak area ratio being a ratio of a peak area in a wavenumber range of from 1,020 $cm^{-1}$ to 1,308 $cm^{-1}$ to a peak area in a wavenumber range of from 1,673 $cm^{-1}$ to 1,779 $cm^{-1}$, is used as the fluorine-containing graft polymer.

Here, the peak in the wavenumber range from 1,020 $cm^{-1}$ to 1,308 $cm^{-1}$ corresponds to a peak due to a fluorine component of the fluorine-containing graft polymer. Specifically, this peak area corresponds to the amount of fluorine component of the fluorine-containing graft polymer.

On the other hand, the peak in the wavenumber range from 1,673 $cm^{-1}$ to 1,779 $cm^{-1}$ corresponds to a peak due to a carbonyl group (that is, $>C=O$) derived from an ester moiety of the fluorine-containing graft polymer. Specifically, this peak area corresponds to the amount of ester moiety of the fluorine-containing graft polymer.

Accordingly, the ratio of the two peak areas corresponds to a ratio of the amount of fluorine component to the amount of ester moiety of the fluorine-containing graft polymer.

When the ratio of the two peak areas (peak area in a wavenumber range of from 1,020 cm$^{-1}$ to 1,308 cm$^{-1}$/peak area in a wavenumber range of from 1,673 cm$^{-1}$ to 1,779 cm$^{-1}$) is within the above range, both the affinity between the fluorine-containing graft polymer and the fluorine-containing resin particles and the affinity between the fluorine-containing graft polymer and the vehicle of the coating liquid are well-balanced. With this balance, the affinity of the fluorine-containing graft polymer to the vehicle of the coating liquid is secured while securing adhesion force of the fluorine-containing graft polymer to the fluorine-containing resin particles, thus exhibiting stabilization of the fluorine-containing resin particles due to the steric hindrance of the fluorine-containing graft polymer.

Accordingly, even when, for example, a mechanical load due to circulation of the coating liquid for forming a surface layer, a temperature change during storage of the coating liquid, a change in components of the coating liquid with time due to, for example, volatilization of a solvent, or a change in component concentrations during drying of a coating film of the coating liquid is caused, a decrease in dispersibility of the fluorine-containing resin particles with time is suppressed, and sedimentation or reaggregation of the fluorine-containing resin particles is unlikely to occur.

As a result, the dispersibility of the fluorine-containing resin particles in the surface layer of the photoreceptor is enhanced to suppress cleaning defects that locally occur.

For the reasons described above, a local decrease in cleanability is considered to be suppressed in the photoreceptor according to the exemplary embodiment.

In the photoreceptor according to the exemplary embodiment, the fluorine-containing resin particles are substantially uniformly dispersed in the surface layer, that is, the fluorine-containing resin particles are dispersed in the surface layer without forming coarse aggregates. If coarse aggregates of the fluorine-containing resin particles are present in the surface layer of the photoreceptor, a difference in charge potential on the surface of the photoreceptor is generated between portions where coarse aggregates are present and portions where coarse aggregates are not present. This difference in charge potential decreases graininess of an image.

However, in the photoreceptor according to the exemplary embodiment, since the fluorine-containing resin particles are unlikely to be present in the surface layer in the form of a coarse aggregate, presumably, the decrease in graininess of an image is also suppressed.

A photoreceptor according to the exemplary embodiment will now be described in detail.

In the photoreceptor according to the exemplary embodiment, an outermost surface layer contains fluorine-containing resin particles and a fluorine-containing graft polymer having a fluorinated alkyl group.

A charge transport layer, a protective layer, or a single-layer-type photosensitive layer corresponds to the outermost surface layer. The outermost surface layer may contain a component other than the fluorine-containing resin particles and the fluorine-containing graft polymer depending on the type of the layer. The other component will be described together with the structures of the respective layers of the photoreceptor.

Fluorine-containing resin particles will now be described.

Examples of the fluorine-containing resin particles include particles of a fluoroolefin homopolymer and particles of a copolymer of two or more monomers, the copolymer being a copolymer of at least one fluoroolefin and a fluorine-free monomer (that is, a monomer that does not contain a fluorine atom).

Examples of the fluoroolefin include perhaloolefins such as tetrafluoroethylene (TFE), perfluorovinyl ether, hexafluoropropylene (HFP), and chlorotrifluoroethylene (CTFE); and non-perfluoroolefins such as vinylidene fluoride (VdF), trifluoroethylene, and vinyl fluoride. Among these, for example, VdF, TFE, CTFE, and HFP are preferred.

On the other hand, examples of the fluorine-free monomer include hydrocarbon olefins such as ethylene, propylene, and butene; alkyl vinyl ethers such as cyclohexyl vinyl ether (CHVE), ethyl vinyl ether (EVE), butyl vinyl ether, and methyl vinyl ether; alkenyl vinyl ethers such as polyoxyethylene allyl ether (POEAE) and ethyl allyl ether; organosilicon compounds having an active α,β-unsaturated group such as vinyltrimethoxysilane (VSi), vinyltriethoxysilane, and vinyltris(methoxyethoxy)silane; acrylic acid esters such as methyl acrylate and ethyl acrylate; methacrylic acid esters such as methyl methacrylate and ethyl methacrylate; and vinyl esters such as vinyl acetate, vinyl benzoate, and "VeoVa" (trade name, vinyl ester manufactured by Shell). Among these, alkyl vinyl ethers, allyl vinyl ether, vinyl esters, and organosilicon compounds having an active α,β-unsaturated group are preferred.

Among these, particles having a high fluorination rate are preferred as the fluorine-containing resin particles. Particles of polytetrafluoroethylene (PTFE), tetrafluoroethylene-hexafluoropropylene copolymers (FEP), tetrafluoroethylene-perfluoro(alkylvinyl ether) copolymers (PFA), ethylene-tetrafluoroethylene copolymers (ETFE), and ethylene-chlorotrifluoroethylene copolymers (ECTFE) are more preferred, and particles of PTFE, FEP, and PFA are particularly preferred.

Examples of the fluorine-containing resin particles include particles obtained by being irradiated with radiation (herein, also referred to as "radiation irradiation-type fluorine-containing resin particles") and particles obtained by a polymerization method (herein, also referred to as "polymerization-type fluorine-containing resin particles").

The radiation irradiation-type fluorine-containing resin particles (fluorine-containing resin particles obtained by being irradiated with radiation) refer to fluorine-containing resin particles that are granulated along with radiation polymerization or fluorine-containing resin particles obtained by irradiating a fluorine-containing resin after polymerization with radiation to decompose the resin, thereby decreasing the molecular weight and forming fine particles.

Since a carboxylic acid is generated in a large amount by irradiating fluorine-containing resin particles with radiation in air, the resulting radiation irradiation-type fluorine-containing resin particles also include a large number of carboxyl groups.

On the other hand, the polymerization-type fluorine-containing resin particles (fluorine-containing resin particles obtained by a polymerization method) refer to fluorine-containing resin particles that are granulated along with polymerization by, for example, a suspension polymerization method or an emulsion polymerization method and that are not irradiated with radiation.

Since the polymerization-type fluorine-containing resin particles are produced by polymerization in the presence of a basic compound, the fluorine-containing resin particles include the basic compound as a residue.

The method for producing fluorine-containing resin particles by the suspension polymerization method is a method in which, for example, additives such as a polymerization initiator and a catalyst are suspended in a dispersion medium together with a monomer for forming a fluorine-containing resin, and a polymerized product is subsequently granulated while polymerizing the monomer.

The method for producing fluorine-containing resin particles by the emulsion polymerization method is a method in which, for example, additives such as a polymerization initiator and a catalyst are emulsified in a dispersion medium together with a monomer for forming a fluorine-containing resin by a surfactant (that is, an emulsifier), and a polymerized product is subsequently granulated while polymerizing the monomer.

That is, existing fluorine-containing resin particles include a large number of carboxyl groups or a large amount of a basic compound.

Fluorine-containing resin particles including a large number of carboxyl groups exhibit ionic conductivity and thus have a property of being unlikely to be charged.

Therefore, when such existing fluorine-containing resin particles including a large number of carboxyl groups are contained in an outermost surface layer of an electrophotographic photoreceptor, the chargeability of the photoreceptor decreases in a high-temperature, high-humidity environment, which may result in the phenomenon in which a toner adheres to a non-image area (hereinafter also referred to as "fogging").

In addition, when fluorine-containing resin particles include a large number of carboxyl groups, the dispersibility tends to decrease. This is because higher-order aggregates are easily generated by an interaction between carboxyl groups, which have high polarity.

Therefore, when such existing fluorine-containing resin particles including a large number of carboxyl groups are contained in an outermost surface layer of an electrophotographic photoreceptor, the cleanability tends to decrease locally.

On the other hand, when fluorine-containing resin particles include a large amount of a basic compound, the basic compound tends to increase aggregation properties of the fluorine-containing resin particles.

Therefore, when such existing fluorine-containing resin particles including a large amount of a basic compound are contained in an outermost surface layer of an electrophotographic photoreceptor, the cleanability tends to decrease locally.

In addition, when fluorine-containing resin particles include a large amount of a basic compound, the basic compound exhibits a hole-trapping property, and thus a decrease in the sensitivity tends to occur.

Therefore, when such existing fluorine-containing resin particles including a large amount of a basic compound are contained in an outermost surface layer of an electrophotographic photoreceptor, the residual potential increases with time, and a decrease in the image density may occur.

Accordingly, the fluorine-containing resin particles may have a number of carboxyl groups of 0 or more and 30 or less per $10^6$ carbon atoms and may include a basic compound in an amount of 0 ppm or more and 3 ppm or less. Note that "ppm" is on a mass basis.

The number of carboxyl groups of the fluorine-containing resin particles may be 0 or more and 20 or less from the viewpoint of suppressing a local decrease in cleanability and suppressing the fogging.

Herein, carboxyl groups of fluorine-containing resin particles are, for example, carboxyl groups derived from terminal carboxylic acids included in the fluorine-containing resin particles.

Examples of the method for reducing the number of carboxyl groups of fluorine-containing resin particles include (1) a method in which radiation irradiation is not performed in the process of producing the particles and (2) a method in which radiation irradiation is performed in the absence of oxygen or in a decreased oxygen concentration.

The number of carboxyl groups of fluorine-containing resin particles is measured as follows in accordance with a method described in, for example, Japanese Unexamined Patent Application Publication No. 4-20507.

Fluorine-containing resin particles are pre-formed by a press machine to prepare a film having a thickness of about 0.1 mm. An infrared absorption spectrum of the prepared film is measured. Fluorine-containing resin particles are brought into contact with fluorine gas to prepare fluorine-containing resin particles whose carboxylic acid terminals have been completely fluorinated. An infrared absorption spectrum of the fluorine-containing resin particles is also measured. The number of terminal carboxyl groups is calculated from a difference spectrum between the two spectra by the following formula.

$$\text{The number of terminal carboxyl groups (per } 10^6 \text{ carbon atoms)} = (l \times K)/t$$

l: Absorbance
K: Correction coefficient
t: Film thickness (mm)

The absorption wavenumber of carboxyl groups is assumed to be 3,560 cm$^{-1}$, and the correction coefficient of carboxyl groups is assumed to be 440.

The amount of a basic compound of the fluorine-containing resin particles is preferably 0 ppm or more and 3 ppm or less, more preferably 0 ppm or more and 1.5 ppm or less, and still more preferably 0 ppm or more and 1.2 ppm or less from the viewpoint of suppressing a local decrease in cleanability and suppressing an increase in the residual potential.

Herein, examples of the basic compound of the fluorine-containing resin particles include (1) a basic compound derived from a polymerization initiator used when fluorine-containing resin particles are granulated along with polymerization, (2) a basic compound used in a step of aggregating fluorine-containing resin particles after polymerization, and (3) a basic compound used as a dispersing aid that stabilizes a dispersion liquid after polymerization.

Examples of the basic compounds that are targets include amine compounds, hydroxides of alkali metals or alkaline earth metals, oxides of alkali metals or alkaline earth metals, and acetates (for example, in particular, amine compounds).

Examples of the basic compounds that are targets include basic compounds having a boiling point (boiling point at atmospheric pressure (at 1 atm)) of 40° C. or higher and 130° C. or lower (preferably 50° C. or higher and 110° C. or lower and more preferably 60° C. or higher and 90° C. or lower).

Examples of the amine compounds include primary amine compounds, secondary amine compounds, and tertiary amine compounds.

Examples of the primary amine compounds include methylamine, ethylamine, propylamine, isopropylamine, n-butylamine, isobutylamine, tert-butylamine, hexylamine, 2-ethylhexylamine, secondary butylamine, allylamine, and methylhexylamine.

Examples of the secondary amine compounds include dimethylamine, diethylamine, di-n-propylamine, diisopropylamine, di-n-butylamine, diisobutylamine, di-tert-butylamine, dihexylamine, di(2-ethylhexyl)amine, N-isopropyl-N-isobutylamine, di-secondary butylamine, diallylamine, N-methylhexylamine, 3-pipecoline, 4-pipecoline, 2,4-lupetidine, 2,6-lupetidine, 3,5-lupetidine, morpholine, and N-methylbenzylamine.

Examples of the tertiary amine compounds include trimethylamine, triethylamine, tri-n-propylamine, triisopropylamine, tri-n-butylamine, triisobutylamine, tri-tert-butylamine, trihexylamine, tri(2-ethylhexyl)amine, N-methylmorpholine, N,N-dimethylallylamine, N-methyldiallylamine, triallylamine, N,N-dimethylallylamine, N,N, N',N'-tetramethyl-1,2-diaminoethane, N,N,N',N'-tetramethyl-1,3-diaminopropane, N,N,N',N'-tetraallyl-1,4-diaminobutane, N-methylpiperidine, pyridine, 4-ethylpyridine, N-propyldiallylamine, 3-dimethylaminopropanol, 2-ethylpyrazine, 2,3-dimethylpyrazine, 2,5-dimethylpyrazine, 2,4-lutidine, 2,5-lutidine, 3,4-lutidine, 3,5-lutidine, 2,4,6-collidine, 2-methyl-4-ethylpyridine, 2-methyl-5-ethylpyridine, N,N,N',N'-tetramethylhexamethylenediamine, N-ethyl-3-hydroxypiperidine, 3-methyl-4-ethylpyridine, 3-ethyl-4-methylpyridine, 4-(5-nonyl)pyridine, imidazole, and N-methylpiperazine.

Examples of the hydroxides of alkali metals or alkaline earth metals include NaOH, KOH, $Ca(OH)_2$, $Mg(OH)_2$, and $Ba(OH)_2$.

Examples of the oxides of alkali metals or alkaline earth metals include CaO and MgO.

Examples of the acetates include zinc acetate and sodium acetate.

Examples of the method for reducing the amount of a basic compound of fluorine-containing resin particles include (1) a method in which, after the production of particles, the particles are washed with, for example, water or an organic solvent (such as an alcohol, e.g., methanol, ethanol, or isopropanol, or tetrahydrofuran) and (2) a method in which, after the production of particles, the particles are heated (for example, to 200° C. or higher and 250° C. or lower) to remove a basic compound by decomposition or vaporization.

The amount of a basic compound of fluorine-containing resin particles is measured as follows.

Pretreatment

When the amount of a basic compound is measured from an outermost surface layer that contains fluorine-containing resin particles, the outermost surface layer is immersed in a solvent (for example, methanol or tetrahydrofuran) to dissolve substances other than the fluorine-containing resin particles and substances that are insoluble in the solvent (for example, methanol or tetrahydrofuran), the resulting solution is then added to pure water dropwise, and the resulting precipitate is separated by filtration. The solution obtained at this time and containing a basic compound is collected. Furthermore, the insoluble matter obtained by filtration is dissolved in a solvent, the resulting solution is then added to pure water dropwise, and the resulting precipitate is separated by filtration. This operation is repeated five times to prepare fluorine-containing resin particles serving as a measurement sample.

When the amount of a basic compound is measured from fluorine-containing resin particles themselves, the fluorine-containing resin particles are subjected to the same treatment as that in the case of a layer product to prepare fluorine-containing resin particles serving as a measurement sample.

Measurement

A calibration curve (calibration curve from 0 ppm to 100 ppm) is obtained by gas chromatography using basic compound solutions (methanol solvent) having known concentrations from the basic compound concentrations of the basic compound solutions (methanol solvent) having the known concentrations and values of the peak area.

The measurement sample is then analyzed by gas chromatography, and the amount of a basic compound of fluorine-containing resin particles is calculated from the obtained peak area and the calibration curve. The measurement conditions are as follows.

Measurement Conditions

Headspace sampler: (HP7694, manufactured by Hewlett-Packard (HP))

Measurement device: Gas chromatograph (HP6890 series, manufactured by Hewlett-Packard (HP))

Detector: Hydrogen flame ionization detector (FID)

Column: HP19091S-433, manufactured by Hewlett-Packard (HP)

Sample heating time: 10 min

Sprit Ratio: 300:1

Flow rate: 1.0 mL/min

Column temperature increase setting: 60° C. (3 min), 60° C./min, 200° C. (1 min)

From the viewpoint of suppressing a local decrease in cleanability, the amount of perfluorooctanoic acid (hereinafter also referred to as "PFOA") in the fluorine-containing resin particles is preferably 0 ppb or more and 25 ppb or less, preferably 0 ppb or more and 20 ppb or less, and more preferably 0 ppb or more and 15 ppb or less relative to the fluorine-containing resin particles. Note that "ppb" is on a mass basis.

During the process of producing fluorine-containing resin particles (in particular, fluorine-containing resin particles such as polytetrafluoroethylene particles, modified polytetrafluoroethylene particles, and perfluoroalkyl ether/tetrafluoroethylene copolymer particles), PFOA is used or generated as a by-product, and thus the resulting fluorine-containing resin particles often include PFOA.

When PFOA is present, the fluorine-containing resin particles in the state of a coating liquid for forming a surface layer has a high dispersibility due to the fluorine-containing graft polymer serving as a fluorine-containing dispersant. However, when the state of the coating liquid changes, (specifically, after the application of the coating liquid, when the concentrations of components in the resulting coating film change in drying of the coating film), the state of the fluorine-containing graft polymer adhering to the fluorine-containing resin particles presumably changes. Specifically, a part of the fluorine-containing graft polymer is presumably separated from the fluorine-containing resin particles due to PFOA. Therefore, the dispersibility of the fluorine-containing resin particles decreases, and aggregation of the fluorine-containing resin particles occurs. Consequently, a local decrease in the cleanability tends to occur.

Therefore, the fluorine-containing resin particles may include PFOA in an amount of 0 ppb or more and 25 ppb or less relative to the fluorine-containing resin particles. That is, preferably, the fluorine-containing resin particles do not include PFOA. Alternatively, even when the fluorine-containing resin particles include PFOA, the amount of PFOA is preferably reduced. Accordingly, a local decrease in the cleanability is further suppressed.

An example of the method for reducing the amount of PFOA is a method in which fluorine-containing resin particles are sufficiently washed with, for example, pure water, alkaline water, an alcohol (such as methanol, ethanol, or isopropanol), a ketone (such as acetone, methyl ethyl ketone, or methyl isobutyl ketone), an ester (such as ethyl acetate), or another common organic solvent (such as toluene or tetrahydrofuran). Washing may be conducted at room temperature. However, the amount of PFOA can be efficiently reduced by washing under heating.

The amount of PFOA is a value measured by the following method.

Pretreatment of Sample

When the amount of PFOA is measured from an outermost surface layer that contains fluorine-containing resin particles, the outermost surface layer is immersed in a solvent (for example, tetrahydrofuran) to dissolve substances other than the fluorine-containing resin particles and substances that are insoluble in the solvent (for example, tetrahydrofuran), the resulting solution is then added to pure water dropwise, and the resulting precipitate is separated by filtration. The solution obtained at this time and containing PFOA is collected. Furthermore, the insoluble matter obtained by filtration is dissolved in a solvent, the resulting solution is then added to pure water dropwise, and the resulting precipitate is separated by filtration. The solution obtained at this time and containing PFOA is collected. This operation is repeated five times. The aqueous solutions collected in all the operations are used as a pretreated aqueous solution.

When the amount of PFOA is measured from fluorine-containing resin particles themselves, the fluorine-containing resin particles are subjected to the same treatment as that in the case of a layer product to prepare a pretreated aqueous solution.

Measurement

A sample solution is prepared using the pretreated aqueous solution obtained by the method described above and measured in accordance with the method described in "Analysis of Perfluorooctanesulfonic Acid (PFOS) and Perfluorooctanoic Acid (PFOA) in Environmental Water, Sediment, and Living Organisms, by Research Institute for Environmental Sciences and Public Health of Iwate Prefecture".

The average particle diameter of the fluorine-containing resin particles according to the exemplary embodiment is not particularly limited but is preferably 0.2 µm or more and 4.5 µm or less, and more preferably 0.2 µm or more and 4 µm or less. Fluorine-containing resin particles (in particular, fluorine-containing resin particles such as PTFE particles) having an average particle diameter of 0.2 µm or more and 4.5 µm or less tend to include PFOA in a large amount. Accordingly, in particular, fluorine-containing resin particles having an average particle diameter of 0.2 µm or more and 4.5 µm or less tend to have low dispersibility. However, when the amount of PFOA is suppressed to be in the above range, even such fluorine-containing resin particles having an average particle diameter of 0.2 µm or more and 4.5 µm have enhanced dispersibility.

The average particle diameter of the fluorine-containing resin particles is a value measured by the following method.

Fluorine-containing resin particles are observed with a scanning electron microscope (SEM) at a magnification of, for example, 5,000 or more to measure the maximum diameters of the fluorine-containing resin particles (secondary particles formed by agglomeration of primary particles). The average determined from the maximum diameters of fifty particles measured as described above is defined as the average particle diameter of the fluorine-containing resin particles. A JSM-6700F manufactured by JEOL LTD. is used as the SEM, and a secondary electron image at an accelerating voltage of 5 kV is observed.

The specific surface area (BET specific surface area) of the fluorine-containing resin particles is preferably 5 m$^2$/g or more and 15 m$^2$/g or less and more preferably 7 m$^2$/g or more and 13 m$^2$/g or less from the viewpoint of dispersion stability.

The specific surface area is a value measured by a nitrogen substitution method using a BET specific surface area analyzer (FlowSorb II 2300, manufactured by Shimadzu Corporation).

The apparent density of the fluorine-containing resin particles is preferably 0.2 g/mL or more and 0.5 g/mL or less, and more preferably 0.3 g/mL or more and 0.45 g/mL or less from the viewpoint of dispersion stability.

The apparent density is a value measured in accordance with JIS K6891 (1995).

The melting temperature of the fluorine-containing resin particles is preferably 300° C. or higher and 340° C. or lower and more preferably 325° C. or higher and 335° C. or lower.

The melting temperature is the melting point measured in accordance with JIS K6891 (1995).

The content of the fluorine-containing resin particles is preferably 1% by mass or more and 30% by mass or less, more preferably 3% by mass or more and 20% by mass or less, and still more preferably 5% by mass or more and 15% by mass or less relative to the total solid content of the outermost surface layer.

Next, the fluorine-containing graft polymer serving as a fluorine-containing dispersant will be described.

The fluorine-containing graft polymer is a fluorine-containing graft polymer having a fluorinated alkyl group.

In an infrared absorption spectrum of the fluorine-containing graft polymer, a ratio of a peak area in a wavenumber range of from 1,020 cm$^{-1}$ to 1,308 cm$^{-1}$ to a peak area in a wavenumber range of from 1,673 cm$^{-1}$ to 1,779 cm$^{-1}$ is 2.7 or more and 4.8 or less.

The peak area ratio (peak area in a wavenumber range of from 1,020 cm$^{-1}$ to 1,308 cm$^{-1}$/peak area in a wavenumber range of from 1,673 cm$^{-1}$ to 1,779 cm$^{-1}$) is preferably 2.8 or more and 4.8 or less, and more preferably 3.5 or more and 4.8 or less from the viewpoint of suppressing a local decrease in cleanability.

The infrared absorption spectrum of the fluorine-containing graft polymer is measured by the method described below.

A fluorine-containing graft polymer to be measured is formed into fine particles or a film to prepare a measurement sample for an attenuated total reflection method (ATR method). Next, for the measurement sample, measurement is performed with an infrared spectrophotometer (manufactured by JASCO CORPORATION: FT/IR-6100, with an ATR unit and a ZnSe window) under the conditions of a number of scans of 64 times and a resolution of 4 cm$^{-1}$ in a wavenumber range of 650 cm$^{-1}$ or more and 4,000 cm$^{-1}$ or less, and an ATR correction is then performed. Thus, an infrared absorption spectrum is obtained.

A peak area in a wavenumber range of from 1,673 cm$^{-1}$ to 1,779 cm$^{-1}$ is determined as carbonyl groups in the fluorine-containing graft polymer.

Similarly, a peak area in a wavenumber range of from 1,020 cm$^{-1}$ to 1,308 cm$^{-1}$ is determined as the sum of a C—F group and a C—O—C group in the fluorine-containing graft polymer.

When an infrared absorption spectrum of a fluorine-containing graft polymer is measured from an outermost surface layer containing the fluorine-containing graft polymer, the fluorine-containing graft polymer serving as a measurement sample is collected as follows.

The outermost surface layer is dissolved in a soluble solvent such as tetrahydrofuran, and fluorine-containing resin particles are filtered with a 0.1 μm-mesh filter. Next, the fluorine-containing resin particles obtained by filtration are heated at a temperature of 100° C. or lower in a solvent such as an aromatic hydrocarbon, e.g., toluene or xylene, a halogenated solvent, e.g., a fluorocarbon, a perfluorocarbon, a hydrochlorofluorocarbon, methylene chloride, or chloroform, an ester solvent, e.g., ethyl acetate or butyl acetate, or a ketone solvent, e.g., acetone, methyl ethyl ketone, methyl isobutyl ketone, or cyclopentanone, or a mixed solvent of two or more of these. The resulting mixture is subsequently filtered and dried to collect a fluorine-containing graft polymer that has adsorbed on the surfaces of the fluorine-containing resin particles by elusion.

Examples of the fluorine-containing graft polymer having the above peak area ratio include polymers obtained by copolymerization of at least a polymerizable compound having a fluorinated alkyl group and a polymerizable compound that does not have a fluorinated alkyl group and that has an ester group (—C(=O)—O—). A fluorine-containing graft polymer having the above peak area ratio is obtained by adjusting the ratio of the amounts of these two polymerizable compounds.

Specifically, examples of the fluorine-containing graft polymer include random or block copolymers of a (meth)acrylate having a fluorinated alkyl group and a monomer that does not have a fluorinated alkyl group and that has an ester group (—C(=O)—O—). The "(meth)acrylate" refers to both an acrylate and a methacrylate.

Examples of the (meth)acrylate having a fluorinated alkyl group include 2,2,2-trifluoroethyl (meth)acrylate and 2,2,3,3,3-pentafluoropropyl (meth)acrylate.

Examples of the monomer that does not have a fluorinated alkyl group and that has an ester group (—C(=O)—O—) include (meth)acrylates such as methoxypolyethylene glycol (meth)acrylate and phenoxypolyethylene glycol (meth)acrylate.

In particular, the fluorine-containing graft polymer may be a fluorinated alkyl group-containing polymer that has a structural unit represented by general formula (FA) below and a structural unit represented by general formula (FB) below.

The fluorinated alkyl group-containing polymer that has a structural unit represented by general formula (FA) below and a structural unit represented by general formula (FB) below will now be described.

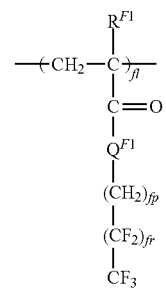
(FA)

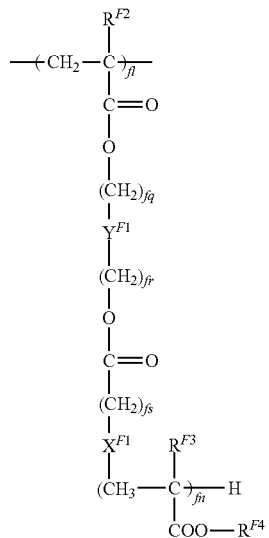
(FB)

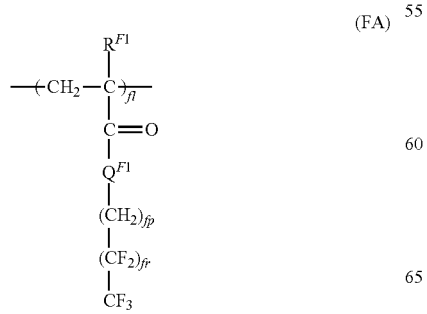
(FA)

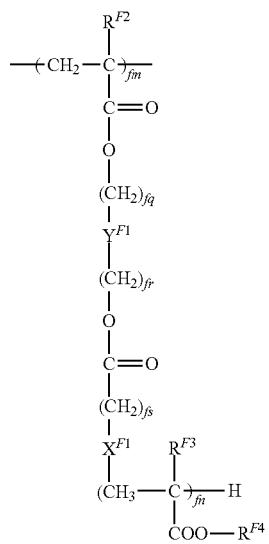
(FB)

In general formulae (FA) and (FB), $R^{F1}$, $R^{F2}$, $R^{F3}$, and $R^{F4}$ each independently represent a hydrogen atom or an alkyl group; $X^{F1}$ represents an alkylene chain, a halogen-substituted alkylene chain, —S—, —O—, —NH—, or a single bond; $Y^{F1}$ represents an alkylene chain, a halogen-substituted alkylene chain, —($C_{fx}H_{2fx-1}$(OH))—, or a single bond; $Q^{F1}$ represents —O— or —NH—; fl, fm, and fn each independently represent an integer of 1 or more; fp, fq, fr, and fs each independently represent an integer of 0 or 1 or more; ft represents an integer of 1 or more and 7 or less; and fx represents an integer of 1 or more.

In general formulae (FA) and (FB), the groups represented by $R^{F1}$, $R^{F2}$, $R^{F3}$, and $R^{F4}$ are each independently preferably a hydrogen atom, a methyl group, an ethyl group, a propyl group, or the like, more preferably a hydrogen atom or a methyl group, and still more preferably a methyl group.

In general formulae (FA) and (FB), the alkylene chains (unsubstituted alkylene chains and halogen-substituted alkylene chains) represented by $X^{F1}$ and $Y^{F1}$ are preferably linear or branched alkylene chains having 1 to 10 carbon atoms.

In $-(C_{fx}H_{2fx-1}(OH))-$ represented by $Y^{F1}$, fx preferably represents an integer of 1 or more and 10 or less.

Furthermore, fp, fq, fr, and fs preferably each independently represent an integer of 0 or 1 or more and 10 or less, and fn is preferably, for example, 1 or more and 60 or less.

In the fluorine-containing graft polymer, a ratio of the structural unit represented by general formula (FA) to the structural unit represented by general formula (FB), that is, fl:fm, is preferably in the range of from 1:9 to 9:1 and more preferably in the range of from 3:7 to 7:3.

The fluorine-containing graft polymer may further have a structural unit represented by general formula (FC) in addition to the structural unit represented by general formula (FA) and the structural unit represented by general formula (FB). A content ratio (fl+fm:fz) of the total (fl+fm) of the structural units represented by general formulae (FA) and (FB) to the structural unit represented by general formula (FC) is preferably in the range of from 10:0 to 7:3 and more preferably in the range of from 9:1 to 7:3.

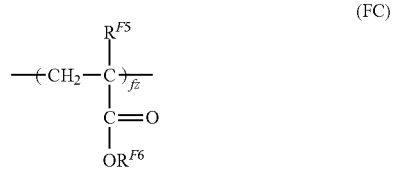

(FC)

In general formula (FC), $R^{F5}$ and $R^{F6}$ each independently represent a hydrogen atom or an alkyl group, and fz represents an integer of 1 or more.

In general formula (FC), the groups represented by $R^{F5}$ and $R^{F6}$ are each independently preferably a hydrogen atom, a methyl group, an ethyl group, a propyl group, or the like, more preferably a hydrogen atom or a methyl group, and still more preferably a methyl group.

The weight-average molecular weight Mw of the fluorine-containing graft polymer is preferably 20,000 or more and 200,000 or less, more preferably 50,000 or more and 200,000 or less, and still more preferably 80,000 or more and 150,000 or less from the viewpoint of improving the dispersibility of the fluorine-containing resin particles (that is, from the viewpoint of suppressing a local decrease in cleanability).

The weight-average molecular weight of the fluorine-containing graft polymer is a value measured by gel permeation chromatography (GPC). The molecular weight measurement by GPC is conducted by, for example, using GPC•HLC-8120 manufactured by TOSOH CORPORATION as a measurement apparatus with TSKgel GMHHR-M+TSKgel GMHHR-M columns (7.8 mm I.D., 30 cm) manufactured by TOSOH CORPORATION and a tetrahydrofuran solvent. The molecular weight is calculated from the measurement results by using a molecular weight calibration curve prepared from monodisperse polystyrene standard samples.

The content of the fluorine-containing graft polymer is, for example, preferably 0.5% by mass or more and 10% by mass or less, and more preferably 1% by mass or more and 7% by mass or less relative to the fluorine-containing resin particles.

The fluorine-containing graft polymers may be used alone or in combination of two or more thereof.

The electrophotographic photoreceptor of the exemplary embodiment will now be described with reference to the drawings.

An electrophotographic photoreceptor 7A illustrated in FIG. 1 includes, for example, a conductive substrate 4, and an undercoat layer 1, a charge generation layer 2, and a charge transport layer 3 that are stacked in this order on the conductive substrate 4. The charge generation layer 2 and the charge transport layer 3 constitute a photosensitive layer 5.

The electrophotographic photoreceptor 7A may have a layer structure that does not include the undercoat layer 1.

The electrophotographic photoreceptor 7A may be a photoreceptor including a single-layer-type photosensitive layer in which the functions of the charge generation layer 2 and the charge transport layer 3 are integrated. In the case of a photoreceptor including a single-layer-type photosensitive layer, the single-layer-type photosensitive layer constitutes the outermost surface layer.

Alternatively, the electrophotographic photoreceptor 7A may be a photoreceptor including a surface protection layer on the charge transport layer 3 or the single-layer-type photosensitive layer. In the case of a photoreceptor including a surface protection layer, the surface protection layer constitutes the outermost surface layer.

The respective layers of the electrophotographic photoreceptor according to the exemplary embodiment will be described in detail. In the description below, reference signs are omitted.

Conductive Substrate

Examples of the conductive substrate include metal plates, metal drums, and metal belts that contain a metal (such as aluminum, copper, zinc, chromium, nickel, molybdenum, vanadium, indium, gold, or platinum) or an alloy (such as stainless steel). Examples of the conductive substrate further include paper sheets, resin films, and belts coated, vapor-deposited, or laminated with a conductive compound (for example, a conductive polymer or indium oxide), a metal (for example, aluminum, palladium, or gold), or an alloy. Herein, "conductive" means that the volume resistivity is less than $10^{13}$ Ω·cm.

The surface of the conductive substrate may be roughened to have a center-line average roughness Ra of 0.04 μm or more and 0.5 μm or less in order to suppress interference fringes generated when the electrophotographic photoreceptor is used in a laser printer and is irradiated with a laser beam. When incoherent light is used as a light source, roughening of the surface for preventing interference fringes is not necessarily performed. However, roughening of the surface suppresses generation of defects due to irregularities on the surface of the conductive substrate and thus is suitable for further extending the lifetime.

Examples of the method for roughening the surface include wet honing with which an abrasive suspended in water is sprayed onto a conductive substrate, centerless grinding with which a conductive substrate is pressed against a rotating grinding stone to perform continuous grinding, and anodic oxidation treatment.

Another example of the method for roughening the surface is a method that includes, instead of roughening the surface of a conductive substrate, dispersing a conductive or semi-conductive powder in a resin, and forming a layer of the resulting resin on a surface of a conductive substrate to form a rough surface by the particles dispersed in the layer.

The surface roughening treatment by anodic oxidation includes forming an oxide film on the surface of a conductive substrate by anodizing, as the anode, a conductive substrate made of a metal (for example, aluminum) in an electrolyte solution. Examples of the electrolyte solution include a sulfuric acid solution and an oxalic acid solution. However, a porous anodized film formed by anodic oxidation is chemically active without further treatment, is likely to be contaminated, and has resistivity that significantly varies depending on the environment. Therefore, the porous anodized film may be subjected to a pore-sealing treatment in which fine pores in the anodized film are sealed by volume expansion caused by hydration reaction in pressurized water vapor or boiling water (a metal salt such as a nickel salt may be added) so as to convert the anodized film into a more stable hydrous oxide.

The thickness of the anodized film is preferably, for example, 0.3 μm or more and 15 μm or less. When the film thickness is within this range, a barrier property against injection tends to be exhibited, and an increase in residual potential caused by repeated use tends to be suppressed.

The conductive substrate may be subjected to a treatment with an acidic treatment solution or a Boehmite treatment.

The treatment with an acidic treatment solution is conducted, for example, as follows. First, an acidic treatment solution containing phosphoric acid, chromic acid, and hydrofluoric acid is prepared. Regarding the blend ratio of phosphoric acid, chromic acid, and hydrofluoric acid in the acidic treatment solution, preferably, for example, phosphoric acid is in the range of from 10% by mass or more and 11% by mass or less, chromic acid is in the range of from 3% by mass or more and 5% by mass or less, hydrofluoric acid is in the range of from 0.5% by mass or more and 2% by mass or less, and the total concentration of these acids is preferably in the range of from 13.5% by mass or more and 18% by mass or less. The treatment temperature is preferably, for example, 42° C. or higher and 48° C. or lower. The resulting film preferably has a thickness of 0.3 μm or more and 15 μm or less.

The Boehmite treatment is conducted, for example, by immersing a conductive substrate in pure water at 90° C. or higher and 100° C. or lower for 5 to 60 minutes or by bringing a conductive substrate into contact with heated water vapor at 90° C. or higher and 120° C. or lower for 5 to 60 minutes. The resulting film preferably has a thickness of 0.1 μm or more and 5 μm or less. The resulting conductive substrate after the Boehmite treatment may be further anodized by using an electrolyte solution having a low film solubility, such as a solution of adipic acid, boric acid, a borate, a phosphate, a phthalate, a maleate, a benzoate, a tartrate, or a citrate.

Undercoat Layer

The undercoat layer is, for example, a layer that contains inorganic particles and a binder resin.

Examples of the inorganic particles include inorganic particles having a powder resistivity (volume resistivity) of $10^2$ Ω·cm or more and $10^{11}$ Ω·cm or less.

As the inorganic particles having the above resistivity, for example, metal oxide particles such as tin oxide particles, titanium oxide particles, zinc oxide particles, and zirconium oxide particles are preferred, and zinc oxide particles are particularly preferred.

The specific surface area of the inorganic particles as measured by the BET method is preferably, for example, 10 $m^2$/g or more.

The volume-average particle diameter of the inorganic particles may be, for example, 50 nm or more and 2,000 nm or less (preferably 60 nm or more and 1,000 nm or less).

The content of the inorganic particles is, for example, preferably 10% by mass or more and 80% by mass or less, and more preferably 40% by mass or more and 80% by mass or less relative to the binder resin.

The inorganic particles may be subjected to a surface treatment. The inorganic particles may be used as a mixture of two or more inorganic particles subjected to different surface treatments or a mixture of two or more inorganic particles having different particle diameters.

Examples of the surface treatment agent include silane coupling agents, titanate-based coupling agents, aluminum-based coupling agents, and surfactants. In particular, silane coupling agents are preferred, and amino-group-containing silane coupling agents are more preferred.

Examples of the amino-group-containing silane coupling agents include, but are not limited to, 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane.

Silane coupling agents may be used as a mixture of two or more thereof. For example, an amino-group-containing silane coupling agent and another silane coupling agent may be used in combination. Examples of the other silane coupling agent include, but are not limited to, vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxy silane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

The surface treatment method with a surface treatment agent may be any known method and, for example, may be a dry method or a wet method.

The treatment amount of the surface treatment agent is preferably, for example, 0.5% by mass or more and 10% by mass or less relative to the inorganic particles.

Here, the undercoat layer may contain an electron-accepting compound (acceptor compound) along with the inorganic particles from the viewpoint of enhancing long-term stability of electrical properties and carrier blocking properties.

Examples of the electron-accepting compound include electron-transporting substances such as quinone compounds, e.g., chloranil and bromanil; tetracyanoquinodimethane compounds; fluorenone compounds, e.g., 2,4,7-trinitrofluorenone and 2,4,5,7-tetranitro-9-fluorenone; oxadiazole compounds, e.g., 2-(4-biphenyl)-5-(4-tert-butylphenyl)-1,3,4-oxadiazole, 2,5-bis(4-naphthyl)-1,3,4-oxadiazole, and 2,5-bis(4-diethylaminophenyl)-1,3,4-oxadiazole; xanthone compounds; thiophene compounds; and diphenoquinone compounds, e.g., 3,3',5,5'-tetra-tert-butyldiphenoquinone.

In particular, a compound having an anthraquinone structure is preferably used as the electron-accepting compound. Preferred examples of the compound having an anthraquinone structure include hydroxyanthraquinone compounds, aminoanthraquinone compounds, and aminohydroxyanthraquinone compounds. Specifically, for example, anthraquinone, alizarin, quinizarin, anthrarufin, and purpurin are preferred.

The electron-accepting compound may be contained in the undercoat layer in a state of being dispersed along with the inorganic particles or in a state of adhering to the surfaces of the inorganic particles.

Examples of the method for causing the electron-accepting compound to adhere to the surfaces of the inorganic particles include a dry method and a wet method.

An example of the dry method is a method with which, while inorganic particles are stirred with a mixer or the like that applies a large shear stress, an electron-accepting compound is added dropwise or sprayed along with dry air or nitrogen gas either directly or in the form of an organic solvent solution to cause the electron-accepting compound to adhere to the surfaces of the inorganic particles. The dropwise addition or spraying of the electron-accepting compound may be conducted at a temperature equal to or lower than the boiling point of the solvent. After the dropwise addition or spraying of the electron-accepting compound, baking may be further conducted at 100° C. or higher. The temperature and time for baking are not particularly limited as long as electrophotographic properties are obtained.

An example of the wet method is a method with which, while inorganic particles are dispersed in a solvent by stirring, by applying ultrasonic waves, or by using a sand mill, an attritor, a ball mill, or the like, an electron-accepting compound is added, and stirred or dispersed, and the solvent is then removed to cause the electron-accepting compound to adhere to the surfaces of the inorganic particles. Examples of the method for removing the solvent include filtration and distillation. After the removal of the solvent, baking may be further conducted at 100° C. or higher. The temperature and time for baking are not particularly limited as long as electrophotographic properties are obtained. In the wet method, water contained in the inorganic particles may be removed before the addition of the electron-accepting compound. Examples of the method for removing the water include a method for removing the water under stirring and heating in the solvent, and a method for removing the water by azeotropy with the solvent.

The adhesion of the electron-accepting compound may be conducted either before or after the inorganic particles are subjected to the surface treatment with the surface treatment agent. Alternatively, the adhesion of the electron-accepting compound and the surface treatment with the surface treatment agent may be conducted at the same time.

The content of the electron-accepting compound may be, for example, 0.01% by mass or more and 20% by mass or less and is preferably 0.01% by mass or more and 10% by mass or less relative to the inorganic particles.

Examples of the binder resin used in the undercoat layer include known materials such as known polymer compounds, e.g., acetal resins (for example, polyvinyl butyral), polyvinyl alcohol resins, polyvinyl acetal resins, casein resins, polyamide resins, cellulose resins, gelatin, polyurethane resins, polyester resins, unsaturated polyester resins, methacrylic resins, acrylic resins, polyvinyl chloride resins, polyvinyl acetate resins, vinyl chloride-vinyl acetate-maleic anhydride resins, silicone resins, silicone-alkyd resins, urea resins, phenolic resins, phenol-formaldehyde resins, melamine resins, urethane resins, alkyd resins, and epoxy resins; zirconium chelate compounds; titanium chelate compounds; aluminum chelate compounds; titanium alkoxide compounds; organotitanium compounds; and silane coupling agents.

Examples of the binder resin used in the undercoat layer further include charge-transporting resins having charge-transporting groups, and conductive resins (such as polyaniline).

Among these, a resin that is insoluble in the coating solvent of an upper layer is suitable as the binder resin used in the undercoat layer. Examples of the particularly suitable resin include thermosetting resins such as urea resins, phenolic resins, phenol-formaldehyde resin, melamine resins, urethane resins, unsaturated polyester resins, alkyd resins, and epoxy resins; and resins obtained by a reaction between a curing agent and at least one resin selected from the group consisting of polyamide resins, polyester resins, polyether resins, methacrylic resins, acrylic resins, polyvinyl alcohol resins, and polyvinyl acetal resins.

When two or more of these binder resins are used in combination, the mixing ratio is determined as necessary.

The undercoat layer may contain various additives to improve electrical properties, environmental stability, and image quality.

Examples of the additives include known materials such as electron-transporting pigments formed of polycyclic condensed compounds, azo compounds, or the like, zirconium chelate compounds, titanium chelate compounds, aluminum chelate compounds, titanium alkoxide compounds, organotitanium compounds, and silane coupling agents. The silane coupling agents are used for the surface treatment of the inorganic particles as described above, but may be further added as an additive to the undercoat layer.

Examples of the silane coupling agents used as an additive include vinyltrimethoxysilane, 3-methacryloxypropyltris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compounds include zirconium butoxide, zirconium ethyl acetoacetate, zirconium triethanolamine, acetylacetonate zirconium butoxide, ethyl acetoacetate zirconium butoxide, zirconium acetate, zirconium oxalate, zirconium lactate, zirconium phosphonate, zirconium octanoate, zirconium naphthenate, zirconium laurate, zirconium stearate, zirconium isostearate, methacrylate zirconium butoxide, stearate zirconium butoxide, and isostearate zirconium butoxide.

Examples of the titanium chelate compounds include tetraisopropyl titanate, tetra-n-butyl titanate, butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanolaminate, and polyhydroxytitanium stearate.

Examples of the aluminum chelate compounds include aluminum isopropylate, monobutoxyaluminum diisopropylate, aluminum butyrate, diethylacetoacetate aluminum diisopropylate, and aluminum tris(ethylacetoacetate).

These additives may be used alone or as a mixture or polycondensate of plural compounds.

The undercoat layer preferably has a Vickers hardness of 35 or more.

In order to suppress moire images, the surface roughness (ten-point average roughness) of the undercoat layer is preferably adjusted to be in the range of from 1/(4n) (where n represents the refractive index of an upper layer) to ½ of the wavelength λ of the exposure laser used.

In order to adjust the surface roughness, resin particles and the like may be added to the undercoat layer. Examples of the resin particles include silicone resin particles, and crosslinked polymethyl methacrylate resin particles. The surface of the undercoat layer may be polished to adjust the surface roughness. Examples of the polishing method include buff polishing, sand blasting, wet honing, and grinding.

The method for forming the undercoat layer is not particularly limited, and any known method is employed. For example, a coating film of a coating liquid for forming an undercoat layer, the coating liquid being prepared by adding the above components to a solvent, is formed, and the resulting coating film is dried and, if necessary, heated.

Examples of the solvent used for preparing the coating liquid for forming an undercoat layer include known organic solvents such as alcohol solvents, aromatic hydrocarbon solvents, halogenated hydrocarbon solvents, ketone solvents, ketone alcohol solvents, ether solvents, and ester solvents.

Specific examples of the solvent include common organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method for dispersing inorganic particles in preparing the coating liquid for forming an undercoat layer include known methods that use a roll mill, a ball mill, a vibrating ball mill, an attritor, a sand mill, a colloid mill, a paint shaker, or the like.

Examples of the method for applying the coating liquid for forming an undercoat layer to the conductive substrate include common methods such as a blade coating method, a wire bar coating method, a spray coating method, a dip coating method, a bead coating method, an air knife coating method, and a curtain coating method.

The thickness of the undercoat layer is, for example, preferably set within the range of 15 μm or more, and more preferably 20 μm or more and 50 μm or less.

Intermediate Layer

An intermediate layer may be further disposed between the undercoat layer and the photosensitive layer, although not illustrated in the drawing.

The intermediate layer is, for example, a layer that contains a resin. Examples of the resin used in the intermediate layer include polymer compounds such as acetal resins (e.g., polyvinyl butyral), polyvinyl alcohol resins, polyvinyl acetal resins, casein resins, polyamide resins, cellulose resins, gelatin, polyurethane resins, polyester resins, methacrylic resins, acrylic resins, polyvinyl chloride resins, polyvinyl acetate resins, vinyl chloride-vinyl acetate-maleic anhydride resins, silicone resins, silicone-alkyd resins, phenol-formaldehyde resins, and melamine resins.

The intermediate layer may be a layer that contains an organometallic compound. Examples of the organometallic compound used in the intermediate layer include organometallic compounds containing a metal atom such as zirconium, titanium, aluminum, manganese, or silicon.

These compounds used in the intermediate layer may be used alone or as a mixture or polycondensate of plural compounds.

In particular, the intermediate layer may be a layer that contains an organometallic compound that contains zirconium atoms or silicon atoms.

The method for forming the intermediate layer is not particularly limited, and any known method is employed. For example, a coating film of a coating liquid for forming an intermediate layer, the coating liquid being prepared by adding the above components to a solvent, is formed, and the resulting coating film is dried and, if necessary, heated.

Examples of the application method for forming the intermediate layer include common methods such as a dip coating method, a lift coating method, a wire bar coating method, a spray coating method, a blade coating method, a knife coating method, and a curtain coating method.

The thickness of the intermediate layer is, for example, preferably set within the range of 0.1 μm or more and 3 μm or less. The intermediate layer may be used as the undercoat layer.

Charge Generation Layer

The charge generation layer is, for example, a layer that contains a charge-generating material and a binder resin. The charge generation layer may be a layer formed by vapor deposition of a charge-generating material. Such a layer formed by vapor deposition of a charge-generating material is suitable when an incoherent light source such as a light emitting diode (LED) or an organic electro-luminescence (EL) image array is used.

Examples of the charge-generating material include azo pigments such as bisazo and trisazo pigments, fused-ring aromatic pigments such as dibromoanthanthrone, perylene pigments, pyrrolopyrrole pigments, phthalocyanine pigments, zinc oxide, and trigonal selenium.

For laser exposure in the near-infrared region, among these, a metal phthalocyanine pigment or a metal-free phthalocyanine pigment is preferably used as the charge-generating material. Specifically, for example, hydroxygallium phthalocyanine, chlorogallium phthalocyanine, dichlorotin phthalocyanine, and titanyl phthalocyanine are more preferred.

On the other hand, for laser exposure in the near-ultra-violet region, for example, a fused-ring aromatic pigment such as dibromoanthanthrone, a thioindigo pigment, a porphyrazine compound, zinc oxide, trigonal selenium, or a bisazo pigment is preferably used as the charge-generating material.

When an incoherent light source, such as an LED or organic EL image array having an emission center wavelength in the range of 450 nm or more and 780 nm or less, is used, the charge-generating material described above may be used. However, from the viewpoint of the resolution, when the photosensitive layer is used in the form of a thin film having a thickness of 20 μm or less, the electric field strength in the photosensitive layer is increased, and a charge reduction due to charge injection from the substrate, that is, an image defect referred to as a "black spot" easily occurs. This becomes noticeable when a p-type semiconductor, which easily produces a dark current, such as trigonal selenium or a phthalocyanine pigment, is used as the charge-generating material.

In contrast, when an n-type semiconductor, such as a fused-ring aromatic pigment, a perylene pigment, or an azo pigment, is used as the charge-generating material, a dark current is unlikely to generate, and an image defect referred to as a black spot can be suppressed even in the case of a thin film.

Whether the n-type or not is determined on the basis of the polarity of a flowing photocurrent by a time-of-flight method that is commonly used. A material which allows electrons to flow more easily than holes as carriers is determined as the n-type.

The binder resin used in the charge generation layer is selected from a wide range of insulating resins. Alternatively, the binder resin may be selected from organic photoconductive polymers, such as poly-N-vinylcarbazole, polyvinyl anthracene, polyvinyl pyrene, and polysilane.

Examples of the binder resin include polyvinyl butyral resins, polyarylate resins (e.g., polycondensates of bisphenols and divalent aromatic carboxylic acids), polycarbonate resins, polyester resins, phenoxy resins, vinyl chloride-vinyl acetate copolymers, polyamide resins, acrylic resins, polyacrylamide resins, polyvinyl pyridine resins, cellulose resins, urethane resins, epoxy resins, casein, polyvinyl alcohol resins, and polyvinylpyrrolidone resins. Herein, "insulating" means that the volume resistivity is $10^{13}$ Ω·cm or more.

These binder resins are used alone or as a mixture of two or more thereof.

The blend ratio of the charge-generating material to the binder resin is preferably in the range of from 10:1 to 1:10 in terms of mass ratio.

The charge generation layer may contain other known additives.

The method for forming the charge generation layer is not particularly limited, and any known method is employed. For example, a coating film of a coating liquid for forming a charge generation layer, the coating liquid being prepared by adding the above components to a solvent, is formed, and the resulting coating film is dried and, if necessary, heated. The charge generation layer may be formed by vapor deposition of a charge-generating material. The formation of the charge generation layer by vapor deposition is particularly suitable for the case where a fused-ring aromatic pigment or a perylene pigment is used as the charge-generating material.

Examples of the solvent used for preparing the coating liquid for forming a charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or as a mixture of two or more thereof.

Examples of the method for dispersing particles (for example, the charge-generating material) in the coating liquid for forming a charge generation layer include methods using a media disperser such as a ball mill, a vibrating ball mill, an attritor, a sand mill, or a horizontal sand mill, or a media-less disperser such as a stirrer, an ultrasonic disperser, a roll mill, or a high-pressure homogenizer. Examples of the high-pressure homogenizer include a collision-type homogenizer in which a dispersion is dispersed through liquid-liquid collision or liquid-wall collision in a high-pressure state, and a penetration-type homogenizer in which a dispersion is dispersed by causing the dispersion to penetrate through a fine flow path in a high-pressure state.

In the case of this dispersion, it is effective to adjust the average particle diameter of the charge-generating material in the coating liquid for forming a charge generation layer to 0.5 μm or less, preferably 0.3 μm or less, and more preferably or 0.15 μm or less.

Examples of the method for applying the coating liquid for forming a charge generation layer to the undercoat layer (or the intermediate layer) include common methods such as a blade coating method, a wire bar coating method, a spray coating method, a dip coating method, a bead coating method, an air knife coating method, and a curtain coating method.

The thickness of the charge generation layer is, for example, preferably set within the range of 0.1 μm or more and 5.0 μm or less, and more preferably 0.2 μm or more and 2.0 μm or less.

Charge Transport Layer

The charge transport layer is, for example, a layer that contains a charge-transporting material and a binder resin. The charge transport layer may be a layer that contains a polymer charge-transporting material.

Examples of the charge-transporting material include electron-transporting compounds such as quinone compounds, e.g., p-benzoquinone, chloranil, bromanil, and anthraquinone; tetracyanoquinodimethane compounds; fluorenone compounds, e.g., 2,4,7-trinitrofluorenone; xanthone compounds; benzophenone compounds; cyanovinyl compounds; and ethylene compounds. Examples of the charge-transporting material further include hole-transporting compounds such as triarylamine compounds, benzidine compounds, aryl alkane compounds, aryl-substituted ethylene compounds, stilbene compounds, anthracene compounds, and hydrazone compounds. These charge-transporting materials are used alone or in combination of two or more thereof. However, the charge-transporting material is not limited to these.

From the viewpoint of charge mobility, the charge-transporting material is preferably a triarylamine derivative represented by structural formula (a-1) below or a benzidine derivative represented by structural formula (a-2) below.

(a-1)

In structural formula (a-1), $Ar^{T1}$, $Ar^{T2}$, and $Ar^{T3}$ each independently represent a substituted or unsubstituted aryl group, $-C_6H_4-C(R^{T4})=C(R^{T5})(R^{T6})$, or $-C_6H_4-CH=CH-CH=C(R^{T7})(R^{T8})$ where $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent for each of the groups described above include halogen atoms, alkyl groups having 1 to 5 carbon atoms, and alkoxy groups having 1 to 5 carbon atoms. Examples of the substituent for each of the groups described above further include substituted amino groups substituted with an alkyl group having 1 to 3 carbon atoms.

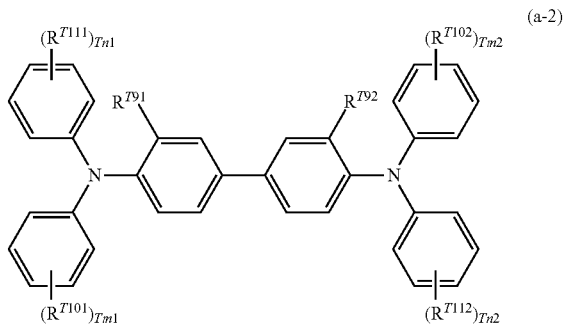

(a-2)

In structural formula (a-2), $R^{T91}$ and $R^{T92}$ each independently represent a hydrogen atom, a halogen atom, an alkyl group having 1 to 5 carbon atoms, or an alkoxy group having 1 to 5 carbon atoms; $R^{T101}$, $R^{T102}$, $R^{T111}$, and $R^{T112}$ each independently represent a halogen atom, an alkyl group having 1 to 5 carbon atoms, an alkoxy group having 1 to 5 carbon atoms, an amino group substituted with an alkyl group having 1 or 2 carbon atoms, a substituted or unsubstituted aryl group, —C($R^{T12}$)=C($R^{T13}$)($R^{T14}$), or —CH=CH—CH=C($R^{T15}$) ($R^{T16}$) where $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or more and 2 or less.

Examples of the substituent for each of the groups described above include halogen atoms, alkyl groups having 1 to 5 carbon atoms, and alkoxy groups having 1 to 5 carbon atoms. Examples of the substituent for each of the groups described above further include substituted amino groups substituted with an alkyl group having 1 to 3 carbon atoms.

Here, among the triarylamine derivatives represented by structural formula (a-1) and the benzidine derivatives represented by structural formula (a-2), a triarylamine derivative having —$C_6H_4$—CH=CH—CH=C($R^{T7}$) ($R^{T8}$) and a benzidine derivative having —CH=CH—CH=C($R^{T15}$) ($R^{T16}$) are preferred from the viewpoint of charge mobility.

A known polymer material having a charge-transporting property, such as poly-N-vinylcarbazole or polysilane is used as the polymer charge-transporting material. In particular, polyester polymer charge-transporting materials are preferred. The polymer charge-transporting material may be used alone or in combination with a binder resin.

Examples of the binder resin used in the charge transport layer include polycarbonate resins, polyester resins, polyarylate resins, methacrylic resins, acrylic resins, polyvinyl chloride resins, polyvinylidene chloride resins, polystyrene resins, polyvinyl acetate resins, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone alkyd resins, phenol-formaldehyde resins, styrene-alkyd resins, poly-N-vinylcarbazole, and polysilane. Among these, a polycarbonate resin or a polyarylate resin is suitable as the binder resin. These binder resins are used alone or in combination of two or more thereof.

The blend ratio of the charge-transporting material to the binder resin is preferably in the range of from 10:1 to 1:5 in terms of mass ratio.

The charge transport layer may further contain other known additives.

The method for forming the charge transport layer is not particularly limited, and any known method is employed. For example, a coating film of a coating liquid for forming a charge transport layer, the coating liquid being prepared by adding the above components to a solvent, is formed, and the resulting coating film is dried and, if necessary, heated.

Examples of the solvent used for preparing the coating liquid for forming a charge transport layer include common organic solvents such as aromatic hydrocarbons, e.g., benzene, toluene, xylene, and chlorobenzene; ketones, e.g., acetone and 2-butanone; halogenated aliphatic hydrocarbons, e.g., methylene chloride, chloroform, and ethylene chloride; and cyclic or linear ethers, e.g., tetrahydrofuran and ethyl ether. These solvents are used alone or as a mixture of two or more thereof.

Examples of the method for applying the coating liquid for forming a charge transport layer to the charge generation layer include common methods such as a blade coating method, a wire bar coating method, a spray coating method, a dip coating method, a bead coating method, an air knife coating method, and a curtain coating method.

The thickness of the charge transport layer is, for example, preferably set within the range of 5 μm or more and 50 μm or less, and more preferably 10 μm or more and 30 μm or less.

Protective Layer

A protective layer is optionally disposed on a photosensitive layer. The protective layer is formed, for example, in order to prevent the photosensitive layer from being chemically changed during charging and to further improve the mechanical strength of the photosensitive layer.

Therefore, the protective layer may be a layer formed of a cured film (crosslinked film). Examples of such a layer include layers described in (1) and (2) below.

(1) A layer formed of a cured film of a composition that contains a reactive-group-containing charge-transporting material having a reactive group and a charge-transporting skeleton in the same molecule (that is, a layer that contains a polymer or crosslinked product of the reactive-group-containing charge-transporting material).

(2) A layer formed of a cured film of a composition that contains a non-reactive charge-transporting material, and a reactive-group-containing non-charge transporting material that does not have a charge-transporting skeleton and that has a reactive group (that is, a layer that contains the non-reactive charge transporting material and a polymer or crosslinked product of the reactive-group-containing non-charge transporting material).

Examples of the reactive group contained in the reactive-group-containing charge-transporting material include known reactive groups such as chain-polymerizable groups, an epoxy group, —OH, —OR (where R represents an alkyl group), —$NH_2$, —SH, —COOH, and —Si$R^{Q1}_{3-Qn}$(O$R^{Q2}$)$_{Qn}$ (where $R^{Q1}$ represents a hydrogen atom, an alkyl group, or a substituted or unsubstituted aryl group, $R^{Q2}$ represents a hydrogen atom, an alkyl group, or a trialkylsilyl group, and Qn represents an integer of 1 to 3).

The chain-polymerizable group may be any radical-polymerizable functional group and is, for example, a functional group having a group that contains at least a carbon double bond. Specifically, an example thereof is a group that contains at least one selected from a vinyl group, a vinyl ether group, a vinyl thioether group, a styryl group (vinylphenyl group), an acryloyl group, a methacryloyl group, and derivatives thereof. Among these, the chain-polymerizable group is preferably a group that contains at least one selected from a vinyl group, a styryl group (vinylphenyl group), an acryloyl group, a methacryloyl group, and derivatives thereof in view of good reactivity.

The charge-transporting skeleton of the reactive-group-containing charge-transporting material may be any known structure used in an electrophotographic photoreceptor. Examples of the charge-transporting skeleton include skeletons that are derived from nitrogen-containing hole-transporting compounds, such as triarylamine compounds, benzidine compounds, and hydrazone compounds, and that have a structure conjugated with a nitrogen atom. Among these, a triarylamine skeleton is preferred.

The reactive-group-containing charge-transporting material that has a reactive group and a charge-transporting skeleton, the non-reactive charge-transporting material, and the reactive-group-containing non-charge transporting material may be selected from known materials.

The protective layer may further contain other known additives.

The method for forming the protective layer is not particularly limited, and any known method is employed. For example, a coating film of a coating liquid for forming a protective layer, the coating liquid being prepared by adding the above components to a solvent, is formed, and the resulting coating film is dried and, if necessary, subjected to a curing treatment such as heating.

Examples of the solvent used for preparing the coating liquid for forming a protective layer include aromatic solvents such as toluene and xylene; ketone solvents such as methyl ethyl ketone, methyl isobutyl ketone, and cyclohexanone; ester solvents such as ethyl acetate and butyl acetate; ether solvents such as tetrahydrofuran and dioxane; cellosolve solvents such as ethylene glycol monomethyl ether; and alcohol solvents such as isopropyl alcohol and butanol. These solvents are used alone or as a mixture of two or more thereof.

The coating liquid for forming a protective layer may be a solvent-free coating liquid.

Examples of the method for applying the coating liquid for forming a protective layer to the photosensitive layer (for example, the charge transport layer) include common methods such as a dip coating method, a lift coating method, a wire bar coating method, a spray coating method, a blade coating method, a knife coating method, and a curtain coating method.

The thickness of the protective layer is, for example, preferably set within the range of 1 μm or more and 20 μm or less, and more preferably 2 μm or more and 10 μm or less.

Single-Layer-Type Photosensitive Layer

The single-layer-type photosensitive layer (charge generation/charge transport layer) is, for example, a layer that contains a charge-generating material, a charge-transporting material, and, optionally, a binder resin and other known additives. These materials are the same as those described in relation to the charge generation layer and the charge transport layer.

The content of the charge-generating material in the single-layer-type photosensitive layer may be 0.1% by mass or more and 10% by mass or less, and is preferably 0.8% by mass or more and 5% by mass or less relative to the total solid content. The content of the charge-transporting material in the single-layer-type photosensitive layer may be 5% by mass or more and 50% by mass or less relative to the total solid content.

The method for forming the single-layer-type photosensitive layer is the same as the method for forming the charge generation layer and the charge transport layer.

The thickness of the single-layer-type photosensitive layer may be, for example, 5 μm or more and 50 μm or less and is preferably 10 μm or more and 40 μm or less.

Image-Forming Apparatus (and Process Cartridge)

An image-forming apparatus of an exemplary embodiment includes an electrophotographic photoreceptor, a charging unit that charges a surface of the electrophotographic photoreceptor, an electrostatic latent image-forming unit that forms an electrostatic latent image on the charged surface of the electrophotographic photoreceptor, a developing unit that develops the electrostatic latent image formed on the surface of the electrophotographic photoreceptor by using a developer that contains a toner to form a toner image, and a transfer unit that transfers the toner image onto a surface of a recording medium. The electrophotographic photoreceptor according to the exemplary embodiment described above is used as the electrophotographic photoreceptor.

The image-forming apparatus according to the exemplary embodiment is applied to a known image-forming apparatus. Examples thereof include an apparatus including a fixing unit that fixes a toner image transferred onto the surface of a recording medium; a direct transfer-type apparatus in which a toner image formed on the surface of an electrophotographic photoreceptor is directly transferred onto a recording medium; an intermediate transfer-type apparatus in which a toner image formed on the surface of an electrophotographic photoreceptor is first transferred to a surface of an intermediate transfer body and the toner image transferred to the surface of the intermediate transfer body is then second transferred to a surface of a recording medium; an apparatus including a cleaning unit that cleans the surface of an electrophotographic photoreceptor after transfer of a toner image and before charging; an apparatus including a charge erasing unit that erases charges on the surface of an electrophotographic photoreceptor by applying charge erasing light after transfer of a toner image and before charging; and an apparatus including an electrophotographic photoreceptor heating member that increases the temperature of an electrophotographic photoreceptor to reduce the relative temperature.

In the intermediate transfer-type apparatus, the transfer unit includes, for example, an intermediate transfer body having a surface onto which a toner image is to be transferred, a first transfer unit that performs first transfer of the toner image formed on the surface of an electrophotographic photoreceptor onto the surface of the intermediate transfer body, and a second transfer unit that performs second transfer of the toner image transferred to the surface of the intermediate transfer body onto a surface of a recording medium.

The image-forming apparatus according to the exemplary embodiment may be an image-forming apparatus with a dry development system or an image-forming apparatus with a wet development system (development system using a liquid developer).

In the image-forming apparatus according to the exemplary embodiment, for example, a part that includes the electrophotographic photoreceptor may be configured as a cartridge structure (process cartridge) that is detachably attachable to the image-forming apparatus. A process cartridge including the electrophotographic photoreceptor according to the exemplary embodiment is suitably used as the process cartridge. The process cartridge may include, in addition to the electrophotographic photoreceptor, for example, at least one selected from the group consisting of a charging unit, an electrostatic latent image-forming unit, a developing unit, and a transfer unit.

Examples of the image-forming apparatus according to the exemplary embodiment will be described below but are not limited thereto. Relevant parts illustrated in the drawings are described, and the description of other parts is omitted.

Figure 2:
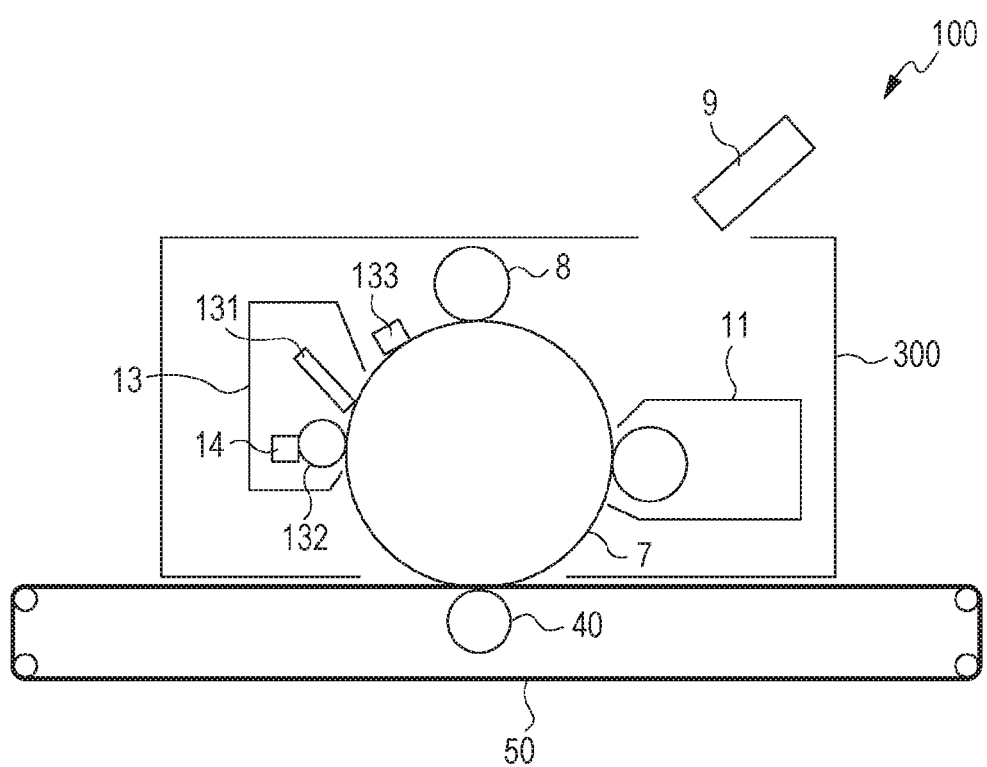
FIG. 2 is a schematic view illustrating an example of an image-forming apparatus according to an exemplary embodiment.

FIG. 2 is a schematic structural view illustrating an example of an image-forming apparatus according to the exemplary embodiment.

As illustrated in FIG. 2, an image-forming apparatus 100 according to the exemplary embodiment includes a process cartridge 300 including an electrophotographic photoreceptor 7, an exposure device 9 (one example of an electrostatic latent image-forming unit), a transfer device 40 (first transfer device), and an intermediate transfer body 50. In the image-forming apparatus 100, the exposure device 9 is arranged at a position so that the exposure device 9 applies light to the electrophotographic photoreceptor 7 through an opening in the process cartridge 300. The transfer device 40 is arranged at a position facing the electrophotographic photoreceptor 7 with the intermediate transfer body 50 therebetween. The intermediate transfer body 50 is arranged so that a part of the intermediate transfer body 50 is in contact with the electrophotographic photoreceptor 7. The image-forming apparatus 100 further includes a second transfer device (not illustrated) that transfers a toner image transferred to the intermediate transfer body 50 onto a recording medium (for example, a paper sheet). The intermediate transfer body 50, the transfer device 40 (first transfer device), and the second transfer device (not shown) correspond to examples of the transfer unit.

The process cartridge 300 in FIG. 2 includes a housing in which the electrophotographic photoreceptor 7, a charging device 8 (one example of a charging unit), a developing device 11 (one example of a developing unit), and a cleaning device 13 (one example of a cleaning unit) are integrally supported. The cleaning device 13 includes a cleaning blade 131 (one example of a cleaning member). The cleaning blade 131 is arranged to come in contact with a surface of the electrophotographic photoreceptor 7. The cleaning member is not limited to the cleaning blade 131. Alternatively, the cleaning member may be a conductive or insulating fibrous member. The conductive or insulating fibrous member may be used alone or in combination with the cleaning blade 131.

FIG. 2 illustrates an example of an image-forming apparatus including a fibrous member 132 (roll-shaped) that supplies a lubricant 14 onto the surface of the electrophotographic photoreceptor 7, and a fibrous member 133 (flat brush-shaped) that assists cleaning. These members are arranged as required.

Structures of the components of the image-forming apparatus according to the exemplary embodiment will now be described.

Charging Device

Examples of the charging device 8 include contact-type chargers that use, for example, conductive or semi-conductive charging rollers, charging brushes, charging films, charging rubber blades, or charging tubes. Non-contact-type roller chargers, and known chargers such as scorotron chargers and corotron chargers that use corona discharge are also used.

Exposure Device

An example of the exposure device 9 is an optical device that illuminates the surface of the electrophotographic photoreceptor 7 with light emitted from a semiconductor laser, an LED, a liquid crystal shutter, or the like so as to form a desired image on the surface. The wavelength of the light source is within the range of the spectral sensitivity of the electrophotographic photoreceptor. Semiconductor lasers that are mainly used are near-infrared lasers having an oscillation wavelength of about 780 nm. However, the wavelength is not limited to this, and a laser having an oscillation wavelength on the order of 600 nm or a blue laser having an oscillation wavelength of 400 nm or more and 450 nm or less may also be used. In order to form color images, a surface-emitting laser light source capable of outputting a multibeam is also effective.

Developing Device

An example of the developing device 11 is a typical developing device that performs development by using a developer in a contact or non-contact manner. The developing device 11 is not limited as long as the device has the above function, and is selected in accordance with the purpose. An example thereof is a known developing device having a function of causing a one-component developer or a two-component developer to adhere to the electrophotographic photoreceptor 7 with a brush, a roller, or the like. In particular, the developing device may use a developing roller that carries the developer on the surface thereof.

The developer used in the developing device 11 may be a one-component developer containing a toner alone or a two-component developer containing a toner and a carrier. The developer may be magnetic or nonmagnetic. A known developer is applied to the developer.

Cleaning Device

A cleaning blade-type device including the cleaning blade 131 is used as the cleaning device 13.

Instead of the cleaning blade-type device, a fur brush cleaning-type device or a simultaneous development cleaning-type device may be employed.

Transfer Device

Examples of the transfer device 40 include contact-type transfer chargers that use, for example, belts, rollers, films, or rubber blades, and known transfer chargers such as scorotron transfer chargers and corotron transfer chargers that use corona discharge.

Intermediate Transfer Body

The intermediate transfer body 50 may be a belt-shaped member (intermediate transfer belt) containing a polyimide, polyamide-imide, polycarbonate, polyarylate, polyester, rubber, or the like that is provided with semiconductivity. The intermediate transfer body may have a drum shape instead of the belt shape.

Figure 3:
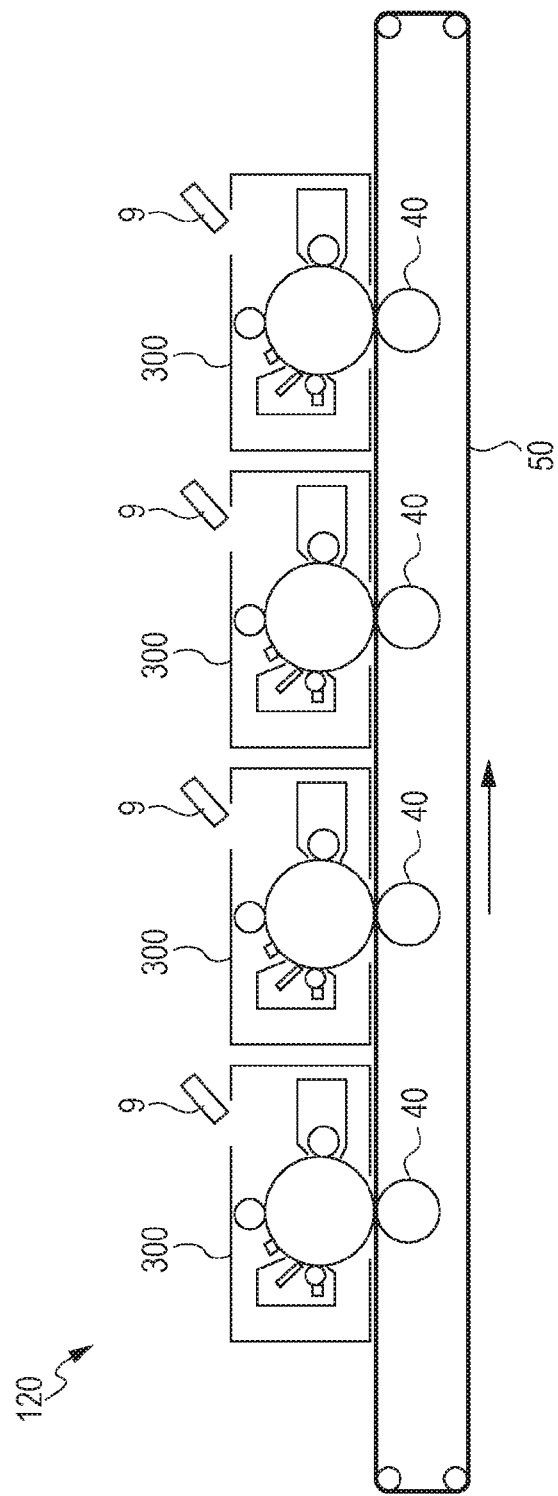
FIG. 3 is a schematic view illustrating another example of the image-forming apparatus according to the exemplary embodiment.

FIG. 3 is a schematic structural view illustrating another example of the image-forming apparatus according to the exemplary embodiment.

An image-forming apparatus 120 illustrated in FIG. 3 is a tandem-system multicolor image-forming apparatus including four process cartridges 300. In the image-forming apparatus 120, the four process cartridges 300 are arranged in parallel on an intermediate transfer body 50, and one electrophotographic photoreceptor is used for one color. The image-forming apparatus 120 has the same configuration as the image-forming apparatus 100 except for the tandem system.

EXAMPLES

Examples of the present disclosure will now be described, but the present disclosure is not limited to the examples described below. In the description below, "part" and "%" are on a mass basis unless otherwise noted.

Production of Fluorine-Containing Resin Particles
Production of Fluorine-Containing Resin Particles (1)

Fluorine-containing resin particles (1) are produced as follows.

In a barrier nylon bag, 100 parts by mass of a commercially available homo-polytetrafluoroethylene fine powder (standard specific gravity measured in accordance with ASTM D 4895 (2004): 2.175) and 2.8 parts by mass of ethanol serving as an additive are placed, and the entire bag is purged with nitrogen. Subsequently, the bag is irradiated with 160 kGy of cobalt-60 γ rays at room temperature to obtain a low-molecular-weight polytetrafluoroethylene powder. The resulting powder is pulverized to obtain fluorine-containing resin particles (1).

Production of Fluorine-Containing Resin Particles (2)

In the production of the fluorine-containing resin particles (1), 100 parts by mass of the obtained particles and 500 parts by mass of methanol are placed and washed with a stirrer at 300 rpm for 10 minutes while applying ultrasonic waves, and the resulting supernatant is removed by decantation. This operation is repeated four times, and the resulting filtration residue is then dried in a fan dryer at 70° C. for 24 hours to produce fluorine-containing resin particles (2).
Production of Fluorine-Containing Resin Particles (3)

Fluorine-containing resin particles (3) are produced as in the production of the fluorine-containing resin particles (1) except that, in the production of the fluorine-containing resin particles (1), the entire bag is purged with nitrogen such that an oxygen concentration is 10%. Production of fluorine-containing resin particles (4)

Fluorine-containing resin particles (4) are produced as in the production of the fluorine-containing resin particles (2) except that, in the production of the fluorine-containing resin particles (2), the fluorine-containing resin particles (3) are used instead of the fluorine-containing resin particles (1).
Production of Fluorine-Containing Resin Particles (5)

In an autoclave equipped with a stirrer, 3.2 L of deionized water, 5.0 g of ammonium perfluorooctanoate, and 120 g of paraffin wax (manufactured by NIPPON OIL CORPORATION) serving as emulsifying stabilizer are charged. The inside of the system is purged with nitrogen three times and with tetrafluoroethylene (TFE) twice to remove oxygen. Subsequently, the internal pressure is adjusted to 0.9 MPa with TFE, and the internal temperature is maintained at 80° C. while stirring at 250 rpm. Next, 20 mL of an aqueous solution prepared by dissolving 15 mg of ammonium persulfate in deionized water, and 20 mL of an aqueous solution prepared by dissolving 200 mg of succinic acid peroxide in deionized water are charged in the system to start a reaction. During the reaction, the temperature in the system is maintained at 80° C., and TFE is continuously supplied so as to constantly maintain the internal pressure of the autoclave to 0.9 MPa. When the amount of TFE consumed by the reaction after the addition of the initiator reaches 1,100 g, the supply of TFE and stirring are stopped, and the pressure in the autoclave is released to the atmospheric pressure to terminate the reaction. The resulting emulsified liquid is allowed to stand and cooled, and the paraffin wax of the supernatant is then removed. Subsequently, the emulsified liquid is transferred to a stainless container equipped with a stirrer, 1.5 L of deionized water is added thereto, and the temperature of the resulting liquid is adjusted to 15° C. To the liquid, 100 g of an aqueous solution in which 20 g of ammonium carbonate and 2 g of triethylamine are dissolved is added, the liquid is stirred at 450 rpm to aggregate fluorine-containing resin particles. Subsequently, the particles are separated by centrifugal separation. Next, the fluorine-containing resin particles are washed by adding 4 L of methanol, stirring the resulting mixture for 30 minutes, and then filtering the mixture. This washing operation is repeated four times, and the resulting fluorine-containing fine particles are dried in a fan dryer at 70° C. for 24 hours to produce fluorine-containing resin particles (5).
Production of Fluorine-Containing Graft Polymer
Production of Fluorine-Containing Graft Polymer (1)

A fluorine-containing graft polymer (1) is synthesized as follows.

In a 500-mL reaction container equipped with a stirrer, a reflux condenser, a thermometer, and a nitrogen gas inlet, 5 parts by mass of methyl isobutyl ketone is placed and stirred, and a temperature of the solution in the reaction container is maintained at 80° C. in a nitrogen gas atmosphere. A mixed solution containing 9 parts by mass of perfluorohexylethyl acrylate, 21 parts by mass of MACROMONOMER AA-6 (manufactured by TOAGOSEI CO., LTD.), 0.25 parts by mass of PERHEXYL O (manufactured by NOF CORPORATION) serving as a polymerization initiator, and 45 parts by mass of methyl isobutyl ketone is added into the reaction container dropwise with a dropping syringe pump over a period of two hours. After completion of the dropwise addition, stirring is further continued for two hours, the temperature of the solution is then increased to 90° C., and stirring is further performed for two hours.

To the methyl isobutyl ketone resin solution obtained after the reaction, 400 mL of methanol is added dropwise to precipitate a fluorine-containing graft polymer. The precipitated solid is separated by filtration and then dried. Thus, 21.2 g of a fluorine-containing graft polymer (1) is obtained.
Production of Fluorine-Containing Graft Polymer (2)

A fluorine-containing graft polymer (2) (24.1 g) is obtained as in the synthesis of the fluorine-containing graft polymer (1) except that, in the synthesis of the fluorine-containing graft polymer (1), the amount of PERHEXYL O is changed from 0.25 parts by mass to 0.2 parts by mass.
Production of Fluorine-Containing Graft Polymer (3)

A fluorine-containing graft polymer (3) (19.8 g) is obtained as in the synthesis of the fluorine-containing graft polymer (1) except that, in the synthesis of the fluorine-containing graft polymer (1), PERHEXYL O is changed to PERBUTYL PV (manufactured by NOF CORPORATION).
Production of Fluorine-Containing Graft Polymer (4)

A fluorine-containing graft polymer (4) (23 g) is produced as in the synthesis of the fluorine-containing graft polymer (1) except that, in the synthesis of the fluorine-containing graft polymer (1), the amount of perfluorohexylethyl acrylate is changed from 9 parts by mass to 11 parts by mass, and the amount of MACROMONOMER AA-6 is changed from 21 parts by mass to 19 parts by mass.
Production of Fluorine-Containing Graft Polymer (5)

A fluorine-containing graft polymer (5) (20.2 g) is produced as in the synthesis of the fluorine-containing graft polymer (1) except that, in the synthesis of the fluorine-containing graft polymer (1), the amount of perfluorohexylethyl acrylate is changed from 9 parts by mass to 11 parts by mass, the amount of MACROMONOMER AA-6 is changed from 21 parts by mass to 19 parts by mass, and the amount of methyl isobutyl ketone is changed from 45 parts by mass to 40 parts by mass.
Production of Fluorine-Containing Graft Polymer (6)

A fluorine-containing graft polymer (6) (21.5 g) is produced as in the synthesis of the fluorine-containing graft polymer (1) except that, in the synthesis of the fluorine-containing graft polymer (1), the amount of methyl isobutyl ketone is changed from 45 parts by mass to 60 parts by mass.
Production of Fluorine-Containing Graft Polymer (7)

A fluorine-containing graft polymer (7) (24 g) is produced as in the synthesis of the fluorine-containing graft polymer (1) except that, in the synthesis of the fluorine-containing graft polymer (1), the amount of PERHEXYL O is changed from 0.25 parts by mass to 0.2 parts by mass, and the stirring time after completion of the dropwise addition is changed from two hours to five hours.
Production of Fluorine-Containing Graft Polymer (8)

A fluorine-containing graft polymer (8) (17 g) is produced as in the synthesis of the fluorine-containing graft polymer (1) except that, in the synthesis of the fluorine-containing graft polymer (1), perfluorohexylethyl acrylate is changed to perfluorobutylethyl acrylate.
Production of Fluorine-Containing Graft Polymer (C1)

Methanol (400 g) is added dropwise to 150 g of a fluorine-containing graft polymer "GF400 (TOAGOSEI CO., LTD.)" (solid content: 25% by weight). The precipitated fluorine-containing graft polymer is separated by filtration and dried to obtain 31 g of a fluorine-containing graft polymer.

This purified product is referred to as a fluorine-containing graft polymer (C1).

Production of Fluorine-Containing Graft Polymer (C2)

The solvent of 50 g of a fluorine-containing graft polymer "GF400 (TOAGOSEI CO., LTD.)" is distilled off to obtain 12.6 g of a fluorine-containing graft polymer.

This polymer is referred to as a fluorine-containing graft polymer (C2).

Production of Fluorine-Containing Graft Polymer (C3)

A fluorine-containing graft polymer (C3) (26 g) is produced as in the synthesis of the fluorine-containing graft polymer (1) except that, in the synthesis of the fluorine-containing graft polymer (1), the solvent is distilled off without conducting the purification treatment including addition of 400 mL of methanol after reaction.

Production of Fluorine-Containing Graft Polymer (C4)

A fluorine-containing graft polymer "LE-604 (KYOEISHA CHEMICAL CO., LTD.)" (50 g) is added dropwise to 250 mL of hexane, and the precipitated fluorine-containing graft polymer is filtered to perform purification.

This purified product is referred to as a fluorine-containing graft polymer (C4).

Production of Fluorine-Containing Graft Polymer (C5)

A fluorine-containing graft polymer (C5) (14 g) is produced as in the synthesis of the fluorine-containing graft polymer (1) except that, in the synthesis of the fluorine-containing graft polymer (1), the amount of perfluorohexylethyl acrylate is changed from 9 parts by mass to 16 parts by mass, and the amount of MACROMONOMER AA-6 is changed from 21 parts by mass to 14 parts by mass.

Example 1

A photoreceptor is produced as follows.
Formation of Undercoat Layer

One hundred parts of zinc oxide (average particle diameter: 70 nm, manufactured by TAYCA CORPORATION, specific surface area: 15 m²/g) is mixed with 500 parts of tetrahydrofuran under stirring, 1.3 parts of a silane coupling agent (KBM503, manufactured by SHIN-ETSU CHEMICAL CO., LTD.) is added thereto, and the resulting mixture is stirred for two hours. Subsequently, tetrahydrofuran is distilled off by vacuum distillation, and baking is performed at 120° C. for three hours. Thus, zinc oxide having a surface treated with the silane coupling agent is obtained.

Next, 110 parts of the surface-treated zinc oxide is mixed with 500 parts of tetrahydrofuran under stirring, a solution prepared by dissolving 0.6 parts of alizarin in 50 parts of tetrahydrofuran is added to the resulting mixture, and the resulting mixture is stirred at 50° C. for five hours. Subsequently, the resulting alizarin-added zinc oxide is separated by vacuum filtration and dried at 60° C. under reduced pressure. Thus, alizarin-added zinc oxide is obtained.

Sixty parts of the alizarin-added zinc oxide, 13.5 parts of a curing agent (blocked isocyanate, SUMIDUR 3175 manufactured by SUMIKA BAYER URETHANE CO., LTD.), 15 parts of a butyral resin (S-LEC BM-1 manufactured by SEKISUI CHEMICAL CO., LTD.), and 85 parts of methyl ethyl ketone are mixed to obtain a mixed solution. Next, 38 parts of this mixed solution and 25 parts of methyl ethyl ketone are mixed, and the resulting mixture is dispersed for two hours in a sand mill using glass beads having a diameter ϕ of 1 mm to obtain a dispersion liquid.

To the dispersion liquid, 0.005 parts of dioctyltin dilaurate serving as a catalyst and 45 parts of silicone resin particles (TOSPEARL 145 produced by MOMENTIVE PERFORMANCE MATERIALS JAPAN LLC) are added to prepare a coating liquid for forming an undercoat layer. The coating liquid is applied to an aluminum substrate having a diameter of 47 mm, a length of 357 mm, and a wall thickness of 1 mm by a dip coating method, and dried and cured at 170° C. for 30 minutes. Thus, an undercoat layer having a thickness of 25 μm is obtained.

Formation of Charge Generation Layer

A mixture containing 15 parts by mass of hydroxygallium phthalocyanine serving as a charge-generating material and having diffraction peaks at least at Bragg angles (2θ±) 0.2° of 7.3°, 16.0°, 24.9° and 28.0° in an X-ray diffraction spectrum obtained by using CuKα characteristic X-rays, 10 parts by mass of a vinyl chloride-vinyl acetate copolymer (VMCH, manufactured by NUC CORPORATION) serving as a binder resin, and 200 parts by mass of n-butyl acetate is stirred and dispersed in a sand mill with glass beads having a diameter ϕ of 1 mm for four hours. To the resulting dispersion liquid, 175 parts by mass of n-butyl acetate and 180 parts by mass of methyl ethyl ketone are added, and the resulting mixture is stirred to prepare a coating liquid for forming a charge generation layer. The coating liquid for forming a charge generation layer is applied to the undercoat layer by dip coating and is then dried at 140° C. for 10 minutes. Thus, a charge generation layer having a thickness of 0.2 μm is formed.

Formation of Charge Transport Layer

To 800 parts by mass of tetrahydrofuran, 40 parts by mass of a charge-transporting material (HT-1), 8 parts by mass of a charge-transporting material (HT-2), and 52 parts by mass of a polycarbonate resin (A) (viscosity-average molecular weight: 50,000) are added and dissolved. To the resulting solution, 8 parts by mass of the fluorine-containing resin particles (1) and 0.3 parts by mass of the fluorine-containing graft polymer (1) are added. The resulting solution is dispersed by using a homogenizer (ULTRA-TURRAX, manufactured by IKA) at 5,500 rpm for two hours to prepare a coating liquid for forming a charge transport layer. The coating liquid is applied to the charge generation layer and is then dried at 140° C. for 40 minutes. Thus, a charge transport layer having a thickness of 28 μm is formed. The resulting aluminum substrate is referred to as an electrophotographic photoreceptor 1.

Polycarbonate resin (A)

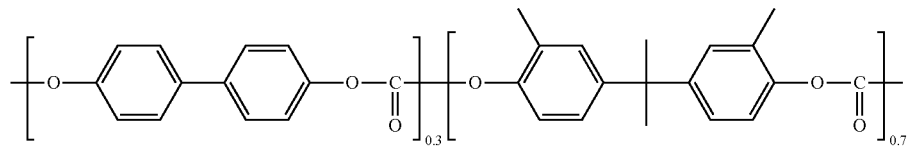

(HT-1)

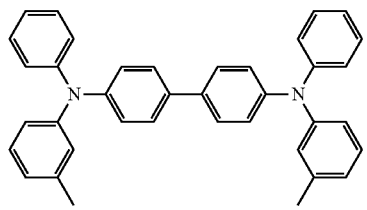

(HT-2)

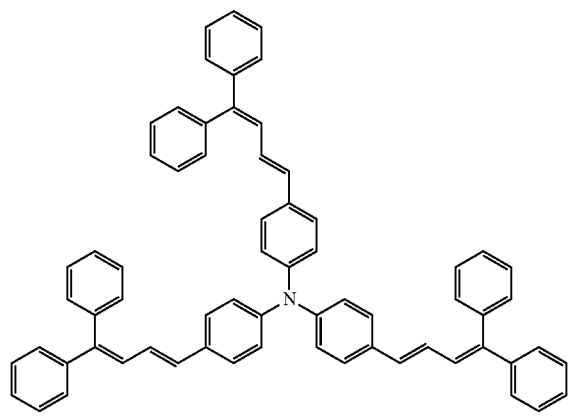

Examples 2 to 12

Photoreceptors are produced as in Example 1 except that the types and amounts of fluorine-containing resin particles and fluorine-containing graft polymer that are blended in the charge transport layer are changed in accordance with Table 3.

Comparative Examples 1 to 7

Photoreceptors are produced as in Example 1 except that the types and amounts of fluorine-containing resin particles and fluorine-containing graft polymer that are blended in the charge transport layer are changed in accordance with Table 3.

Evaluation
Measurements

The following properties of the fluorine-containing resin particles are measured in accordance with the methods described above.

The number of carboxyl groups per $10^6$ carbon atoms (denoted by "number of COOH groups" in Table 1)
Amount of basic compound (ppm)
Amount of PFOA (ppb)

The following properties of the fluorine-containing graft polymers are measured in accordance with the methods described above.

Peak area ratio in infrared absorption spectrum (peak area in a wavenumber range of from 1,020 $cm^{-1}$ to 1,308 $cm^{-1}$/peak area in a wavenumber range of from 1,673 $cm^{-1}$ to 1,779 $cm^{-1}$) (denoted by "peak area ratio F/C=O" in Table 2)
Weight-average molecular weight Mw Evaluation of Dispersion Stability (Centrifugation Test) of Fluorine-Containing Resin Particles The dispersion stability (centrifugation test) of fluorine-containing resin particles is evaluated as follows.

Dispersion coating liquids that are the same as those prepared in the charge transport layer of the electrophotographic photoreceptor 1 are prepared by using the fluorine-containing resin particles and the fluorine-containing graft polymers whose types and the amounts are shown in Table 3.

Each of the dispersion coating liquids is placed in a 1.5-mL sample tube and centrifuged with a centrifugal separator at 6,000 revolutions per minute for five minutes.

The dispersion stability is evaluated by visual observation in accordance with the following evaluation criteria.

A++: The entire inner sample tube is opaque, and no sedimentation of the fluorine-containing resin particles is observed.

A+: The entire inner sample tube is opaque. Although a difference in concentration is observed between an upper portion and a bottom portion of the sample tube, there is no problem.

A: The entire inner sample tube is opaque. Although sediment of the fluorine-containing resin particles is slightly observed in a bottom portion of the sample tube, the degree of the sediment is acceptable.

B: The inner sample tube has transparency. Sediment of the fluorine-containing resin particles is apparently present in a bottom portion of the sample tube, and dispersion stability is poor.

C: The entire inner sample tube is transparent. Sediment of almost all the fluorine-containing resin particles is present in a bottom portion of the sample tube, and dispersion stability is poor.

Evaluation of Cleanability

The cleanability of each photoreceptor is evaluated as follows.

The photoreceptor of each example is mounted on an image-forming apparatus (trade name: ApeosPort-IV C3375 manufactured by FUJI XEROX CO., LTD.). A halftone image with an image density of 5% is formed on A4 paper sheets (210×297 mm, P-paper manufactured by FUJI XEROX CO., LTD.) by using this apparatus in an initial state and in a high-temperature high-humidity environment (28° C., 85% RH) until the cumulative number of rotations of the photoreceptor reaches 100,000 cycles. Subsequently, a halftone image with an image density of 50% is successively output on 20 sheets. The image on the 20th sheet is visually observed to evaluate whether image defects such as streaks are generated or not.

The evaluation is performed in accordance with the following evaluation criteria.

A+: There is no problem in terms of image quality.
A: Although streak defects are slightly observed, the defects are negligible in terms of image quality.
B: Apparent streak defects are observed, and the defects cause a problem.
C: Streak defects are observed on a front surface, and the defects cause a problem.

TABLE 1

| | Fluorine-containing resin particle | | | |
|---|---|---|---|---|
| Type | Number of COOH groups | Amount of basic compound (ppm) | Type of basic compound | Amount of PFOA (ppb) |
| (1) | 18 | 2 | Triethylamine (Boiling point: 89° C.) | 23 |
| (2) | 17 | 1 | Triethylamine (Boiling point: 89° C.) | 7 |
| (3) | 34 | 1 | Triethylamine (Boiling point: 89° C.) | 20 |
| (4) | 33 | 0 | Triethylamine (Boiling point: 89° C.) | 15 |
| (5) | 10 | 3 | Triethylamine (Boiling point: 89° C.) | 5 |

TABLE 2

| | Fluorine-containing graft polymer | |
|---|---|---|
| Type | Peak area ratio F/C=O | Mw |
| (1) Synthesized product | 2.9 | 68,000 |
| (2) Synthesized product | 3.7 | 93,000 |
| (3) Synthesized product | 3.8 | 63,000 |
| (4) Synthesized product | 3.9 | 35,300 |
| (5) Synthesized product | 4.8 | 76,800 |
| (6) Synthesized product | 4.0 | 52,200 |
| (7) Synthesized product | 2.7 | 140,400 |
| (8) Synthesized product | 2.9 | 91,800 |
| (C1) GF400 purified product | 2.6 | 124,700 |
| (C2) GF400 solid | 2.1 | 99,000 |
| (C3) Synthesized product | 2.6 | 61,000 |
| (C4) LE604 purified product | 1.4 | 31,000 |
| (C5) Synthesized product | 5.0 | 40,000 |

TABLE 3

| | Fluorine-containing resin particle | | Fluorine-containing graft polymer | | Evaluation | |
|---|---|---|---|---|---|---|
| | Type | Amount (parts) | Type | Amount (parts) | Dispersion stability | Cleanability |
| Example 1 | (1) | 8 | (1) Synthesized product | 0.3 | A+ | A |
| Example 2 | (1) | 8 | (2) Synthesized product | 0.3 | A | A+ |
| Example 3 | (1) | 8 | (3) Synthesized product | 0.3 | A | A+ |
| Example 4 | (1) | 8 | (4) Synthesized product | 0.3 | A | A+ |
| Example 5 | (1) | 8 | (5) Synthesized product | 0.3 | A | A+ |
| Example 6 | (1) | 8 | (6) Synthesized product | 0.3 | A | A+ |
| Example 7 | (1) | 8 | (7) Synthesized product | 0.3 | A | A |
| Example 8 | (1) | 8 | (8) Synthesized product | 0.3 | A | A |
| Example 9 | (2) | 8 | (1) Synthesized product | 0.3 | A | A |
| Example 10 | (3) | 8 | (2) Synthesized product | 0.3 | A | A+ |
| Example 11 | (4) | 8 | (5) Synthesized product | 0.3 | A+ | A+ |
| Example 12 | (5) | 8 | (1) Synthesized product | 0.6 | A++ | A+ |
| Comparative Example 1 | (1) | 8 | (C1) GF400 purified product | 0.3 | B | B |
| Comparative Example 2 | (1) | 8 | (C2) GF400 solid | 0.3 | C | B |
| Comparative Example 3 | (1) | 8 | (C3) Synthesized product | 0.3 | C | B |
| Comparative Example 4 | (1) | 8 | (C4) LE604 purified product | 0.3 | C | B |
| Comparative Example 5 | (1) | 8 | (C5) Synthesized product | 0.3 | B | B |
| Comparative Example 6 | (2) | 8 | (C1) GF400 purified product | 0.3 | B | C |
| Comparative Example 7 | (3) | 8 | (C1) GF400 purified product | 0.3 | C | C |

The above evaluation results show that the dispersion stability and the cleanability in Examples are better than those in Comparative Examples.

The evaluation results also show that, in Examples in which the number of carboxyl groups and the amount of basic compound are controlled, the dispersion stability and the cleanability are good.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An electrophotographic photoreceptor comprising:
   a conductive substrate; and
   a photosensitive layer disposed on the conductive substrate,
   wherein an outermost surface layer of the electrophotographic photoreceptor contains fluorine-containing resin particles and a fluorine-containing graft polymer having a fluorinated alkyl group,
   the electrophotographic photoreceptor is configured such that, in an infrared absorption spectrum of the fluorine-containing graft polymer, a ratio of a peak area in a wavenumber range of from 1,020 cm$^{-1}$ to 1,308 cm$^{-1}$ to a peak area in a wavenumber range of from 1,673 cm$^{-1}$ to 1,779 cm$^{-1}$ is 3.5 or more and 4.8 or less, and a number of carboxyl groups in the fluorine-containing resin particles is 0 or more and 30 or less per 10$^6$ carbon atoms, and an amount of a basic compound in the fluorine-containing resin particles is 0 ppm or more and 3 ppm or less.

2. The electrophotographic photoreceptor according to claim 1, wherein the fluorine-containing graft polymer is a polymer obtained by copolymerization of at least a polymerizable compound having a fluorinated alkyl group and a polymerizable compound that does not have a fluorinated alkyl group and that has an ester group.

3. The electrophotographic photoreceptor according to claim 2, wherein the polymer is a fluorinated alkyl group-containing polymer that has a structural unit represented by general formula (FA) and a structural unit represented by general formula (FB):

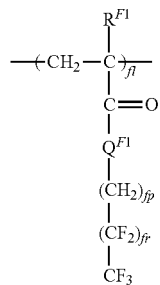

(FA)

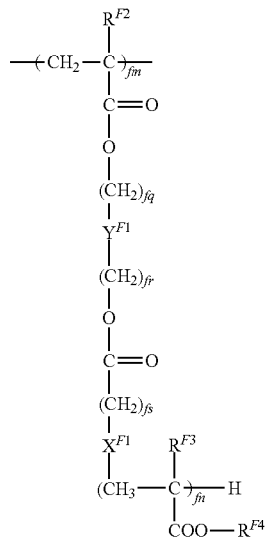

(FB)

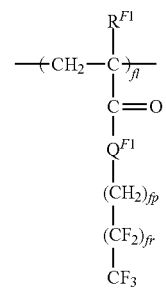

(FA)

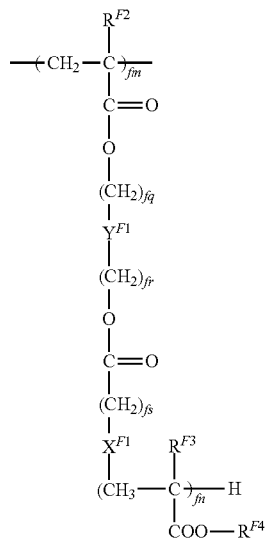

(FB)

where $R^{F1}$, $R^{F2}$, $R^{F3}$, and $R^{F4}$ each independently represent a hydrogen atom or an alkyl group; $X^{F1}$ represents an alkylene chain, a halogen-substituted alkylene chain, —S—, —O—, —NH—, or a single bond; $Y^{F1}$ represents an alkylene chain, a halogen-substituted alkylene chain, —(C$_{fx}$H$_{2fx-1}$(OH))—, or a single bond; $Q^{F1}$ represents —O— or —NH—; fl, fm, and fn each independently represent an integer of 1 or more; fp, fq, fr, and fs each independently represent an integer of 0 or 1 or more; ft represents an integer of 1 or more and 7 or less; and fx represents an integer of 1 or more.

4. The electrophotographic photoreceptor according to claim 1, wherein the fluorine-containing graft polymer has a weight-average molecular weight Mw of 20,000 or more and 200,000 or less.

5. The electrophotographic photoreceptor according to claim 4, wherein the fluorine-containing graft polymer has a weight-average molecular weight Mw of 50,000 or more and 200,000 or less.

6. The electrophotographic photoreceptor according to claim 1, wherein a content of the fluorine-containing graft polymer is 0.5% by mass or more and 10% by mass or less relative to the fluorine-containing resin particles.

7. The electrophotographic photoreceptor according to claim 1, wherein the number of carboxyl groups is 0 or more and 20 or less per $10^6$ carbon atoms, and the amount of the basic compound is 0 ppm or more and 3 ppm or less.

8. The electrophotographic photoreceptor according to claim 7, wherein the number of carboxyl groups is 0 or more and 20 or less per $10^6$ carbon atoms, and the amount of the basic compound is 0 ppm or more and 1.5 ppm or less.

9. The electrophotographic photoreceptor according to claim 1, wherein the basic compound is an amine compound.

10. The electrophotographic photoreceptor according to claim 1, wherein the basic compound has a boiling point of 40° C. or higher and 130° C. or lower.

11. The electrophotographic photoreceptor according to claim 1, wherein an amount of perfluorooctanoic acid in the fluorine-containing resin particles is 0 ppb or more and 25 ppb or less.

12. The electrophotographic photoreceptor according to claim 11, wherein the amount of perfluorooctanoic acid in the fluorine-containing resin particles is 0 ppb or more and 20 ppb or less.

13. A process cartridge detachably attachable to an image-forming apparatus, the process cartridge comprising:
the electrophotographic photoreceptor according to claim 1.

14. An image-forming apparatus comprising:
the electrophotographic photoreceptor according to claim 1;
a charging unit that charges a surface of the electrophotographic photoreceptor;
an electrostatic latent image-forming unit that forms an electrostatic latent image on the charged surface of the electrophotographic photoreceptor;
a developing unit that develops the electrostatic latent image formed on the surface of the electrophotographic photoreceptor by using a developer that contains a toner to form a toner image; and
a transfer unit that transfers the toner image onto a surface of a recording medium.

* * * * *